US010534570B2

United States Patent
Nakahara

(10) Patent No.: US 10,534,570 B2
(45) Date of Patent: Jan. 14, 2020

(54) IMAGE FORMING SYSTEM FOR RELAYING COMMUNICATION BETWEEN A SERVER ON AN INTERNET AND AN IMAGE FORMING DEVICE, RELAY SERVER, COMMUNICATION CONTROLLING METHOD AND NON-TRANSITORY COMPUTER READABLE RECORDING MEDIUM

(71) Applicant: Konica Minolta, Inc., Chiyoda-ku, Tokyo (JP)

(72) Inventor: Kei Nakahara, Suita (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 81 days.

(21) Appl. No.: 14/631,338

(22) Filed: Feb. 25, 2015

(65) Prior Publication Data
US 2015/0242177 A1   Aug. 27, 2015

(30) Foreign Application Priority Data

Feb. 27, 2014   (JP) .................................. 2014-036166

(51) Int. Cl.
*G06F 3/12* (2006.01)
*H04L 29/06* (2006.01)

(52) U.S. Cl.
CPC ............ *G06F 3/1288* (2013.01); *G06F 3/121* (2013.01); *G06F 3/1224* (2013.01); *G06F 3/1287* (2013.01); *H04L 63/029* (2013.01)

(58) Field of Classification Search
None
See application file for complete search history.

(56) References Cited

U.S. PATENT DOCUMENTS 6,020,973 A * 2/2000 Levine ................ G06F 3/1203
358/1.15
6,337,745 B1   1/2002 Aiello, Jr. et al.
(Continued)

FOREIGN PATENT DOCUMENTS

| JP | 2002-007238 A | 1/2002 |
|---|---|---|
| JP | 3948278 B2 | 4/2007 |

(Continued)

OTHER PUBLICATIONS

Communication pursuant to Article 94(3) EPC dated Mar. 16, 2018, by the European Patent Office in corresponding European Patent Application No. 15 155 551.3. (7 pages).
(Continued)

*Primary Examiner* — Nicholas Pachol
(74) *Attorney, Agent, or Firm* — Buchanan Ingersoll & Rooney PC

(57) ABSTRACT

An image forming system comprises: an application server installed on an internet; multiple image forming devices installed on a local network; multiple relay servers, installed on the local network, relaying communication between at least one of the multiple image forming devices and the application server; and a connection mediation server, installed on the internet, sending an access request to one of the multiple relay servers, and connecting the relay server to the application server. The connection mediation server includes: a relay server identifying part configured to identify the relay server which relays the communication between one of the multiple image forming devices and the application server from among the multiple relay servers; and an access request sending part configured to send the access request to the relay server identified by the relay server identifying part, and establish the communication (Continued)

between the image forming device and the application server.

34 Claims, 17 Drawing Sheets

(56) References Cited

U.S. PATENT DOCUMENTS

| | | | | |
|---|---|---|---|---|
| 6,564,256 | B1* | 5/2003 | Tanaka | G06F 19/321 709/203 |
| 6,771,385 | B1* | 8/2004 | Iizuka | G06F 3/1204 358/1.15 |
| 9,223,529 | B1* | 12/2015 | Khafizova | G06F 3/1204 |
| 2001/0055285 | A1 | 12/2001 | Tomoike | |
| 2002/0024686 | A1* | 2/2002 | Uchiyama | G06F 3/14 358/407 |
| 2002/0059489 | A1* | 5/2002 | Davis | G06F 3/1285 710/72 |
| 2002/0089692 | A1* | 7/2002 | Ferlitsch | G06F 3/121 358/1.15 |
| 2003/0123463 | A1 | 7/2003 | Yoshida et al. | |
| 2003/0174360 | A1* | 9/2003 | Ohshima | G06F 3/1203 358/1.15 |
| 2004/0042033 | A1* | 3/2004 | Sesek | G06F 3/1261 358/1.15 |
| 2005/0102442 | A1* | 5/2005 | Ferlitsch | G06F 3/1204 710/15 |
| 2005/0117176 | A1* | 6/2005 | Benz | G06F 3/1203 358/1.15 |
| 2005/0206917 | A1* | 9/2005 | Ferlitsch | G06K 15/02 358/1.5 |
| 2006/0007482 | A1* | 1/2006 | Nakahashi | H04N 1/00204 358/1.15 |
| 2009/0070372 | A1* | 3/2009 | Mukund | G03G 15/5075 |
| 2010/0174827 | A1 | 7/2010 | Nakayama | |
| 2010/0217874 | A1* | 8/2010 | Anantharaman | H04L 29/12528 709/228 |
| 2011/0228319 | A1* | 9/2011 | Miyazawa | G06F 3/1203 358/1.15 |
| 2011/0276986 | A1* | 11/2011 | Kamath | G06F 3/1203 719/328 |
| 2012/0092721 | A1* | 4/2012 | Jaudon | G06F 3/1204 358/1.15 |
| 2012/0218599 | A1 | 8/2012 | Kashioka | |
| 2012/0224197 | A1* | 9/2012 | Suzuki | G06K 15/002 358/1.9 |
| 2012/0246221 | A1* | 9/2012 | Miyawaki | G06F 21/6236 709/203 |
| 2012/0307293 | A1* | 12/2012 | Natori | G06F 3/1205 358/1.15 |
| 2013/0135668 | A1* | 5/2013 | Minagawa | G06F 3/1204 358/1.15 |
| 2013/0148155 | A1* | 6/2013 | Kitagata | G06F 3/1294 358/1.15 |
| 2013/0163037 | A1* | 6/2013 | Huster | G06F 3/1205 358/1.15 |
| 2013/0163038 | A1* | 6/2013 | Oishi | G06F 3/1204 358/1.15 |
| 2013/0201509 | A1* | 8/2013 | Miyazawa | H04N 1/00962 358/1.13 |
| 2013/0301080 | A1* | 11/2013 | Nakata | G06F 3/1204 358/1.15 |
| 2014/0078541 | A1* | 3/2014 | Takano | G06F 3/1203 358/1.14 |
| 2014/0226179 | A1* | 8/2014 | Minagawa | G06F 3/1204 358/1.15 |
| 2014/0297728 | A1* | 10/2014 | Yanagawa | G06F 3/0611 709/203 |
| 2014/0324949 | A1* | 10/2014 | Satomi | H04L 65/1069 709/203 |
| 2014/0376377 | A1 | 12/2014 | Mikoda et al. | |

FOREIGN PATENT DOCUMENTS

| | | |
|---|---|---|
| JP | 2008-225644 A | 9/2008 |
| JP | 5159991 B1 | 3/2013 |

OTHER PUBLICATIONS

Communication pursuant to Article 94(3) EPC dated Aug. 19, 2019, by the European Patent Office in corresponding European Patent Application No. 15 155 551.3. (11 pages).

* cited by examiner

FIG. 3

LIST INFORMATION 17

| RELAY SERVER | DEVICE CAPABLE OF COMMUNICATE | DEVICE TO BE MANAGED |
|---|---|---|
| RELAY SERVER 8a | IMAGE FORMING DEVICE 7a | YES |
| | IMAGE FORMING DEVICE 7b | YES |
| | IMAGE FORMING DEVICE 7c | YES |
| | IMAGE FORMING DEVICE 7d | NO |
| | IMAGE FORMING DEVICE 7e | NO |
| | IMAGE FORMING DEVICE 7f | NO |
| | IMAGE FORMING DEVICE 7g | NO |
| | IMAGE FORMING DEVICE 7h | NO |
| | IMAGE FORMING DEVICE 7i | NO |
| RELAY SERVER 8b | IMAGE FORMING DEVICE 7a | NO |
| | IMAGE FORMING DEVICE 7b | NO |
| | IMAGE FORMING DEVICE 7c | NO |
| | IMAGE FORMING DEVICE 7d | YES |
| | IMAGE FORMING DEVICE 7e | YES |
| | IMAGE FORMING DEVICE 7f | YES |
| | IMAGE FORMING DEVICE 7g | NO |
| | IMAGE FORMING DEVICE 7h | NO |
| | IMAGE FORMING DEVICE 7i | NO |
| RELAY SERVER 8c | IMAGE FORMING DEVICE 7a | NO |
| | IMAGE FORMING DEVICE 7b | NO |
| | IMAGE FORMING DEVICE 7c | NO |
| | IMAGE FORMING DEVICE 7d | NO |
| | IMAGE FORMING DEVICE 7e | NO |
| | IMAGE FORMING DEVICE 7f | NO |
| | IMAGE FORMING DEVICE 7g | YES |
| | IMAGE FORMING DEVICE 7h | YES |
| | IMAGE FORMING DEVICE 7i | YES |

FIG. 5

MANAGEMENT INFORMATION 29

| DEVICE TO BE MENEGED | SERVER CAPABLE OF COMMUNICATE | ADDRESS |
|---|---|---|
| IMAGE FORMING DEVICE 7a | RELAY SERVER 8b | 192.168.1.20 |
| | RELAY SERVER 8c | 192.168.1.30 |
| IMAGE FORMING DEVICE 7b | RELAY SERVER 8b | 192.168.1.20 |
| | RELAY SERVER 8c | 192.168.1.30 |
| IMAGE FORMING DEVICE 7c | RELAY SERVER 8b | 192.168.1.20 |
| | RELAY SERVER 8c | 192.168.1.30 |

FIG. 11

LIST INFORMATION 17

| RELAY SERVER | OPERATING CONDITIONS | DEVICE CAPABLE OF COMMUNICATE | DEVICE TO BE MANAGED |
|---|---|---|---|
| RELAY SERVER 8a | BUSY | IMAGE FORMING DEVICE 7a | YES |
| | | IMAGE FORMING DEVICE 7b | YES |
| | | IMAGE FORMING DEVICE 7c | YES |
| | | IMAGE FORMING DEVICE 7d | NO |
| | | IMAGE FORMING DEVICE 7e | NO |
| | | IMAGE FORMING DEVICE 7f | NO |
| | | IMAGE FORMING DEVICE 7g | NO |
| | | IMAGE FORMING DEVICE 7h | NO |
| | | IMAGE FORMING DEVICE 7i | NO |
| RELAY SERVER 8b | BUSY | IMAGE FORMING DEVICE 7a | NO |
| | | IMAGE FORMING DEVICE 7b | NO |
| | | IMAGE FORMING DEVICE 7c | NO |
| | | IMAGE FORMING DEVICE 7d | YES |
| | | IMAGE FORMING DEVICE 7e | YES |
| | | IMAGE FORMING DEVICE 7f | YES |
| | | IMAGE FORMING DEVICE 7g | NO |
| | | IMAGE FORMING DEVICE 7h | NO |
| | | IMAGE FORMING DEVICE 7i | NO |
| RELAY SERVER 8c | STANDBY | IMAGE FORMING DEVICE 7a | NO |
| | | IMAGE FORMING DEVICE 7b | NO |
| | | IMAGE FORMING DEVICE 7c | NO |
| | | IMAGE FORMING DEVICE 7d | NO |
| | | IMAGE FORMING DEVICE 7e | NO |
| | | IMAGE FORMING DEVICE 7f | NO |
| | | IMAGE FORMING DEVICE 7g | YES |
| | | IMAGE FORMING DEVICE 7h | YES |
| | | IMAGE FORMING DEVICE 7i | YES |

FIG. 12

MANAGEMENT INFORMATION 29

| DEVICE TO BE MANAGED | SERVER CAPABLE OF COMMUNICATE | ADDRESS | OPERATING CONDITIONS |
|---|---|---|---|
| IMAGE FORMING DEVICE 7a | RELAY SERVER 8b | 192.168.1.20 | BUSY |
| | RELAY SERVER 8c | 192.168.1.30 | STANDBY |
| IMAGE FORMING DEVICE 7b | RELAY SERVER 8b | 192.168.1.20 | BUSY |
| | RELAY SERVER 8c | 192.168.1.30 | STANDBY |
| IMAGE FORMING DEVICE 7c | RELAY SERVER 8b | 192.168.1.20 | BUSY |
| | RELAY SERVER 8c | 192.168.1.30 | STANDBY |

IMAGE FORMING SYSTEM FOR RELAYING COMMUNICATION BETWEEN A SERVER ON AN INTERNET AND AN IMAGE FORMING DEVICE, RELAY SERVER, COMMUNICATION CONTROLLING METHOD AND NON-TRANSITORY COMPUTER READABLE RECORDING MEDIUM

This application is based on the application No. 2014-036166 filed in Japan, the contents of which are hereby incorporated by reference.

BACKGROUND OF THE INVENTION

Field of the Invention

The present invention relates to an image forming system, a relay server, a communication controlling method and a non-transitory computer readable recording medium. The present invention more specifically relates to a technique for relaying a communication between a server installed on an internet and an image forming device.

Description of the Background Art

In recent years, a various types of application servers such as a SaaS (Software as a Service) application have been installed on a cloud on an internet, and cloud services by the application servers have been provided over the internet. Users are allowed to access the cloud service at anytime and anywhere as long as they are able to go online, resulting in enhanced user-friendliness. As an example of a way to use the cloud service, data of documents, for instance, is stored on the application server, and the data is sent to an image forming device installed on an internal local network from the application server, thereby producing a printed output.

There is a firewall between the local network and the internet, so the data cannot be sent to the image forming device installed on the local network from the application server on the internet even when a print instruction is given by the user to the application server. In order to allow such data transmission, an image forming system as shown in FIG. 17 is introduced, for example.

The conventional image forming system of FIG. 17 includes an application server 110 and a connection mediation server 111, which works together with the application server 110, on an internet 100. On a local area network 101 such as an internal LAN (Local Area Network), multiple relay servers 120 and 121 and multiple image forming devices 130, 131, 132, 133, 134 and 135 are installed. The relay servers 120 and 121 relay communication between some image forming devices that are set in advance as objects of management from among the multiple image forming devices 130 to 135 and the application server 110. When the relay servers 120 and 121 are powered on and started up, they establish connection 140 with the connection mediation server 111 on the internet 100. As a result, the connection mediation server 111 is allowed to transmit and receive data at any time to and from the relay servers 120 and 121 on the local network 101 over the firewall.

For data transmission to the image forming device 130 on the local network 101 from the application server 110 on the image forming system, for example, the application server 110 sends a communication start request D101 designating the image forming device 130 to the connection mediation server 111. In response to receiving the communication start request D101, the connection mediation server 111 identifies the relay server 120 which manages the image forming device 130 based on information registered in advance, then sends a connection request D102 to the identified relay server 120. The connection request D102 thereby sent includes information such as address information used for connecting to the application server 110. After receiving the connection request D102 from the connection mediation server 111, the relay server 120 sends an access start request D103 to the application server 110 based on the address information included in the connection request D102. The connection between the relay server 120 and the application server 110 is then established so that the application server 110 is allowed to start data transmission to the relay server 120 on the local network 101. As the data transmission from the application server 110 is started, the relay server 120 relays the data transmission. To be more specific, the relay server 120 forwards the data received from the application server 110 to the image forming device 130. As a result, the image forming device 130 is allowed to receive the data sent from the application server 110 via the relay server 120 and produce the printed output based on the received data.

On the above-described conventional image forming system, the relay server 120 manages more than one image forming device and relays communication between any application server installed on the internet 100 and each of more than one image forming device. In some cases, the relay server 120 may have already been busy by the time it receives the connection request D102 from the connection mediation server 111. The busy state refers to a state when any value of CPU utilization, memory utilization on the relay server 120 or the number of address to which the relay server 120 accesses exceeds a predetermined reference value. In such cases, the relay server 120 may start new communication relay process by establishing connection with the application server 110 based on the new connection request D102 received from the connection mediation server 111. In this case, the process performance on the relay server 120 extremely lowered. The relay server 120 may be a bottleneck which reduces a data transmission rate between the application server 110 and the image forming device 130.

In order to solve the problem, the connection mediation server 111 may monitor loads on the multiple relay servers 120 and 121 and determine one of the relay servers which relays communication between the application server 110 and the image forming device 130 depending on the load placed on each relay server 120 and 121, for example. This known technique is introduced for example in Japanese Patent Application Laid-Open No. JP 2002-007238 A. According to the known technique, the connection mediation server 111 stores load information sent from each relay server 120 and 121 on a regular basis and determines the relay server based on the load information stored at receipt of a communication start request D101 from the application server 110. Thus, the load placed on each relay server 120 and 121 cannot be shown on a real-time basis. As a result, the relay server thereby determined may have already been busy at a time of determination of the relay server so that this does not help solving the aforementioned problem.

The connection mediation server 111 may receive the load information in real time from each relay server 120 and 121 in response to receiving the communication start request D101 from the application server 110. In this case, however, communication over the internet 100 is required for acquiring the real-time load information, and the relay server cannot be determined efficiently. In such a case, a long time is required until starting data transmission from the application server 110.

SUMMARY OF THE INVENTION

The present invention is intended to solve the above conventional problems. Thus, the present invention is intended to provide an image forming system, a relay server, a communication controlling method and a non-transitory computer readable recording medium capable of handing over a relay process of communication between an application server and an image forming device efficiently without any communication over an internet when a heavy load is placed on the relay server.

First, the present invention is directed to an image forming system.

According to an aspect of the image forming system, the image processing device image forming system comprises: an application server installed on an internet; multiple image forming devices installed on a local network connected to the internet via a firewall; multiple relay servers, installed on the local network, relaying communication between at least one of the multiple image forming devices and the application server; and a connection mediation server, installed on the internet, sending an access request to one of the multiple relay servers, and connecting the relay server to the application server. The connection mediation server includes: a relay server identifying part configured to identify a relay server which relays the communication between one of the multiple image forming devices and the application server from among the multiple relay servers in response to receiving a communication start request to start the communication between the application server and one of the multiple image forming devices; and an access request sending part configured to send the access request to the relay server identified by the relay server identifying part, and establish the communication between the image forming device and the application server. The relay server includes: a conditions determining part configured to determine whether or not operating conditions of its device is busy when receiving the access request from the connection mediation server; an alternative device selecting part configured to select another relay server which is allowed to establish communication with the image forming device from among the multiple relay servers when the conditions determining part determines that the operating conditions of its device is busy; and a relay process handing over part configured to send an alternating request to an alternative device when the alternative device selecting part selects the another relay server as the alternative device, and causing the alternative device to perform a process of relaying the communication between the image forming device and the application server.

Second, the present invention is directed to a relay server installed on a local network connected to an internet via a firewall. The relay server accesses a connection mediation server on the internet and connects an application server on the internet in response to receiving an access request from the connection mediation server. The relay server relays communication between an image forming device on the local network and the application server.

According to an aspect of the relay server, the relay server comprises: a conditions determining part configured to determine whether or not operating conditions of its device is busy when receiving the access request from the connection mediation server; an alternative device selecting part configured to select another relay server which is allowed to establish communication with the image forming device as an alternative device when the conditions determining part determines that the operating conditions of its device is busy; and a relay process handing over part configured to send an alternating request to the alternative device when the alternative device selecting part selects the another relay server as the alternative device, and cause the alternative device to perform a process of relaying the communication between the image forming device and the application server.

Third, the present invention is directed to a communication controlling method performed on a relay server installed on a local network connected to an internet via a firewall.

According to an aspect of the communication controlling method, the communication controlling method comprises the steps of: (a) connecting to a connection mediation server installed on the internet; and (b) connecting to an application server installed on the internet in response to receiving an access request from the connection mediation server, and relaying a communication between an image forming device installed on the local network and the application server. The step (b) further comprises the steps of: (b-1) determining whether or not operating conditions of its device is busy when receiving the access request from the connection mediation server; (b-2) selecting another relay server which is allowed to establish communication with the image forming device as an alternative device when it is determined that the operating conditions of its device is busy; and (b-3) sending an alternating request to the alternative device, and causing the alternative device to perform a process of relaying the communication between the image forming device and the application server when the another relay server is selected as the alternative device.

Forth, the present invention is directed to a non-transitory computer readable recording medium on which a program is recorded. The program is executable on a relay server installed on a local network connected to an internet via a firewall. The relay server connects to a connection mediation server installed on the internet and connects to an application server on the internet in response to receiving an access request from the connection mediation server. The relay server relays a communication between the image forming device installed on the local network and the application server.

According to an aspect of the non-transitory computer readable recording medium, the program is executed on the relay server to function as a system comprising: a conditions determining part configured to determine whether or not operating conditions of its device is busy when receiving the access request from the connection mediation server; an alternative device selecting part configured to select another relay server which is allowed to establish communication with the image forming device as an alternative device when the conditions determining part determines that the operating conditions of its device is busy; and a relay process handing over part configured to send an alternating request to the alternative device when the alternative device selecting part selects the another relay server as the alternative device and causing the alternative device to perform a process of relaying the communication between the image forming device and the application server.

Fifth, the present invention is directed to a connection mediation server established on an internet and cause a relay server configured in an image forming device to connect to an application server established on the internet.

According to an aspect of the connection mediation server, the connection mediation server comprises: a relay server identifying part configured to identify the relay server which relays communication between one of multiple image forming devices and the application server from among multiple the relay servers in response to receiving a communication start request designating the one of multiple image forming devices; and an access request sending part configured to send an access request to the relay server identified by the relay server identifying part, and establish the communication between the one of multiple image forming devices and the application server.

Sixth, the present invention is directed to a connection mediation server established on an internet and cause a relay server configured in an image forming device to connect to an application server established on the internet.

According to an aspect of the connection mediation server, the connection mediation server comprises: a relay server managing part configured to manage in advance multiple the relay servers.

Seventh, the present invention is directed to a communication controlling method performed on a connection mediation server established on an internet to cause a relay server configured in an image forming device to connect to an application server established on the internet.

According to an aspect of the communication controlling method, the communication controlling method comprises the steps of: identifying the relay server which relays communication between one of multiple image forming devices and the application server from among multiple the relay servers in response to receiving a communication start request designating the one of multiple image forming devices; and sending an access request to the identified relay server, and establishing the communication between the one of multiple image forming devices and the application server.

Eighth, the present invention is directed to on a connection mediation server established on an internet to cause a relay server configured in an image forming device to connect to an application server established on the internet.

According to an aspect of the communication controlling method, the communication controlling method comprises the steps of: managing in advance multiple the relay servers.

Ninth, the present invention is directed to a non-transitory computer readable recording medium on which a program is recorded. The program is executable on a connection mediation server established on an internet and causes a relay server configured in an image forming device to connect to an application server established on the internet.

According to an aspect of the non-transitory computer readable recording medium, the program causes the connection mediation server to execute the steps of: identifying the relay server which relays communication between one of multiple image forming devices and the application server from among multiple the relay servers in response to receiving a communication start request designating the one of multiple image forming devices; and sending an access request to the identified relay server, and establishing the communication between the one of multiple image forming devices and the application server.

Tenth, the present invention is directed to a non-transitory computer readable recording medium on which a program is recorded. The program is executable on a connection mediation server established on an internet and causes a relay server configured in an image forming device to connect to an application server established on the internet.

According to an aspect of the non-transitory computer readable recording medium, the program causes the connection mediation server to execute the step of: managing in advance multiple the relay servers.

BRIEF DESCRIPTION OF THE DRAWINGS

FIG. 3 is an example of list information managed by a relay server managing part;

FIG. 5 is an example of management information managed by an information managing part;

FIG. 11 is an example of list information managed by the connection mediation server of the second preferred embodiment;

FIG. 12 is an example of management information managed by the relay server of the second preferred embodiment;

DESCRIPTION OF THE PRESENT PREFERRED EMBODIMENTS

Figure 1:
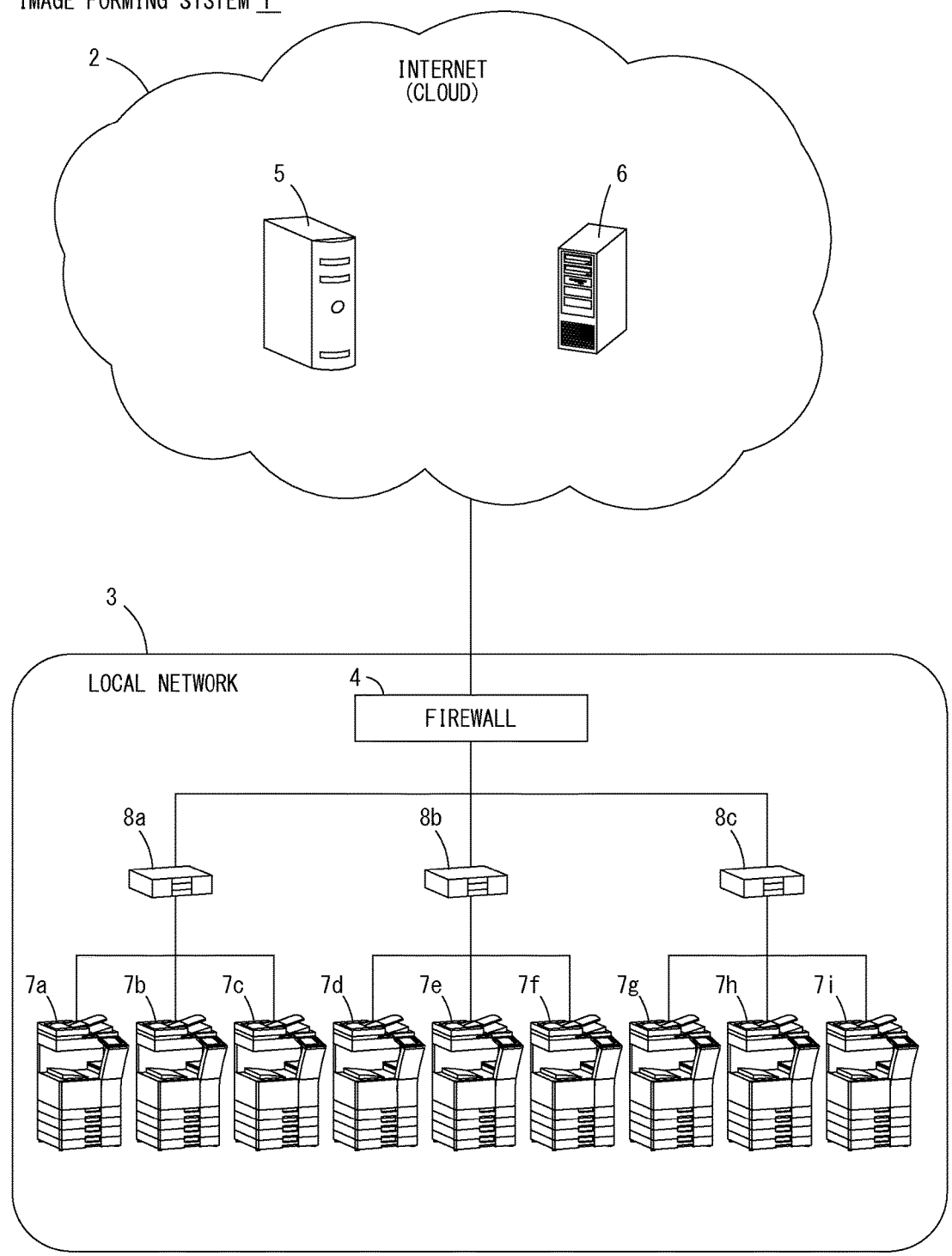
FIG. 1 shows an exemplary configuration of an image forming system.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an image forming system 1. On the image forming system 1, in a network environment in which an internet 2 and a local network 3 such as an internal LAN are connected to each other via a firewall 4, an application server 5 and a connection mediation server 6 are installed on the internet 2, and the firewall 4, multiple relay servers 8a, 8b and 8c and multiple image forming devices 7a to 7i are installed on the local network 3.

The application server 5 is a server which provides a variety of application services (cloud services) by applications including a SaaS (Software as a Service), for instance. Although in FIG. 1, the application server 5 is shown, it is general to have multiple application servers 5 on the internet 2, and each server provides different services. The connection mediation server 6 relays connection between the application server 5 and one of the multiple image forming devices 7a to 7i installed on the local network 3 in response to receiving a request from the application server 5 so that communication between the application server 5 and the specified image forming device is established.

The firewall 4 is an interface which connects the local network 3 such as the internal LAN with the internet 2. The firewall 4 allows communication between devices installed on the local network 3 when the devices access the server on the internet 2. When the devices on the local network 3 do not access the server on the internet 2, the firewall 4 terminates the accesses from the server to the local network 3.

Each of the relay servers 8a, 8b and 8c is a gateway server which manages at least one of the multiple image forming devices 7a to 7i specified in advance and relays communication between the managed image forming device and the application server 5. The image forming devices 7a to 7i are formed from devices such as MFPs (Multi-functional peripherals) or printers capable of executing print jobs based on data received over the local network 3 to produce printed outputs, for instance. Each of the image forming devices 7a to 7i is managed by any one of the multiple relay servers 8a, 8b and 8c. In the example of FIG. 1, the image forming devices 7a, 7b and 7c are managed by the relay server 8a, the image forming devices 7d, 7e and 7f are managed by the relay server 8b, and the image forming devices 7g, 7h and 7i are managed by the relay server 8c. Each of the relay servers 8a, 8b and 8c is capable of establishing communication with any one of the image forming devices, even the one which does not manage, over the local network 3.

Each of the relay servers 8a, 8b and 8c on the aforementioned image forming system 1 establishes continuous connection with the connection mediation server 6 on the internet 2 via the firewall 4 in response to being powered on. Thus, the connection mediation server 6 is allowed to establish communication with each of the relay servers 8a, 8b and 8c on the local network 3 via the firewall at any time.

It is assumed, for example, a user accesses the application server 5 with an information processing terminal such as a smart phone, a tablet terminal or a personal computer and selects data such as document data stored on the application server 5. The user may give a print instruction with designating one of the multiple image forming devices 7a to 7i as selecting the data. In response to receiving the print instruction, the application server 5 sends a communication start request to the connection mediation server 6. After receiving the communication start request from the application server 5, the connection mediation server 6 identifies the relay server which manages the image forming device that is designated with the communication start request, then sending an access request to the identified relay server. The user may designate the image forming device 7a as a device to produce the printed output, for instance. In this case, the connection mediation server 6 identifies the relay server 8a which manages the image forming device 7a from among the multiple relay servers 8a, 8b and 8c, and sends the access request to the relay server 8a. This access request contains information such as address information to access the application server 5. After receiving the access request from the connection mediation server 6, the relay server 8a accesses the application server 5 based on the access request if it is not busy. As a result, the data to print such as the document data is forwarded from the application server 5 to the relay server 8a. The relay server 8a relays communication between the application server 5 and the image forming device 7a and sends the data received from the application server 5 to the image forming device 7a. After the data transmission, the image forming device 7a produces the printed output based on the data to print.

The relay server 8a has a function not to establish connection with the application server 5 and to hand over a relay process of the communication between the application server 5 and the image forming device 7a to another relay server 8b or 8c if operating conditions of its device is busy at the time of receipt of the access request from the connection mediation server 6. The specific configurations and performances of the connection mediation server 6 and the relay servers 8a, 8b and 8c are explained in detail below.

Figure 2:
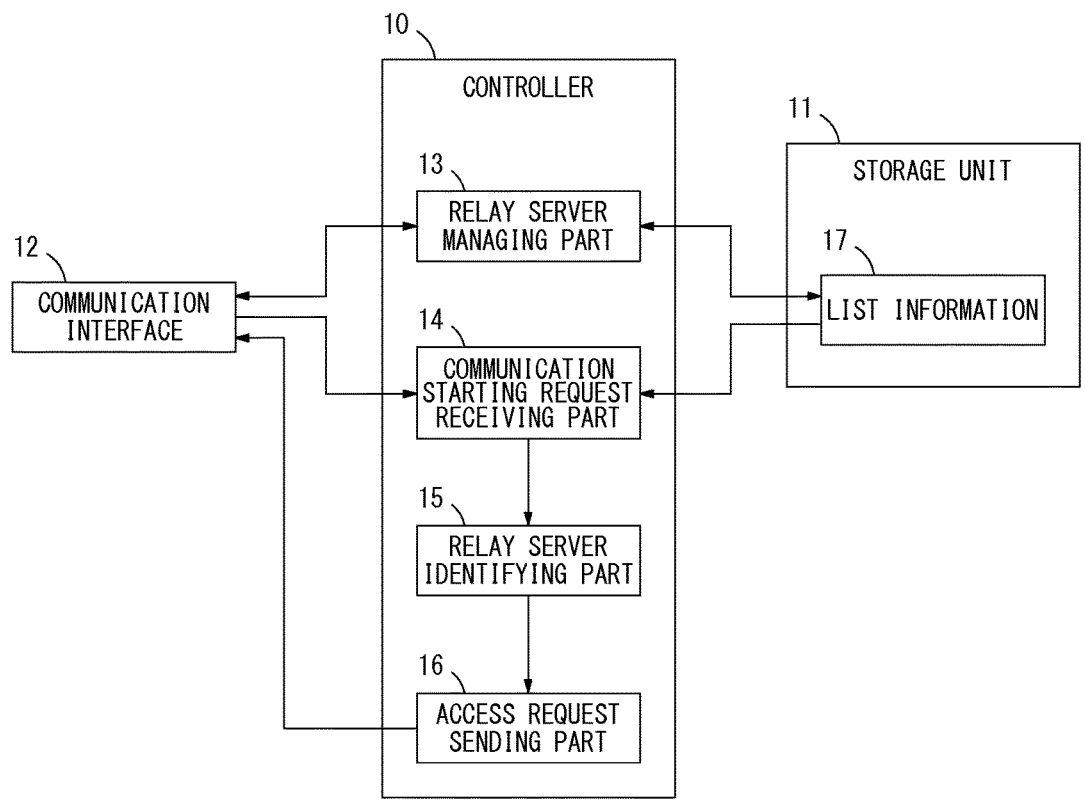
FIG. 2 is a block diagram showing an exemplary hardware configuration and functional configuration of a connection mediation server.

The connection mediation server 6 is explained at first. FIG. 2 is a block diagram showing an exemplary hardware configuration and functional configuration of the connection mediation server 6. The connection mediation server 6 includes a controller 10, a storage unit 11 and a communication interface 12. The controller 10 is formed from a CPU and a memory, and the storage unit 11 is formed from a device such as a hard disk drive (HDD). The communication interface 12 establishes communication with the application server 5 and the relay servers 8a, 8b and 8c. The CPU executes a predetermined program so that the controller 10 serves as a relay server managing part 13, a communication start request receiving part 14, a relay server identifying part 15 and an access request sending part 16.

The relay server managing part 13 manages each of the multiple relay servers 8a, 8b and 8c installed on the local network 3. After establishing the constant connection with the connection mediation server 6, each relay server 8a, 8b and 8c searches for the image forming device with which it is allowed to establish communication on the local network 3 at a regular basis, and notifies the connection mediation server 6 of the search result. The relay server managing part 13 generates list information (device information) which includes information relating to the image forming device with which the respective relay servers 8a, 8b and 8c are allowed to establish communication based on the notification information received from each relay server 8a, 8b and 8c at the regular basis. The relay server managing part 13 stores the generated list information 17 in the storage unit 11 and manages. The relay server managing part 13 allocates the image forming device to manage to the corresponding relay server 8a, 8b or 8c, and registers the allocated image forming device corresponding to the respective relay server 8a, 8b and 8c with the list information 17. When, for example, the relay server 8a notifies of the image forming device with which it is allowed to establish communication, the relay server managing part 13 registers the image forming device which is not managed by any of the other relay servers 8b and 8c as the device to be managed by the relay server 8a from among the image forming devices contained in the notification information. The maximum number of the image forming devices managed by each relay server 8a, 8b and 8c is set in advance (for instance, maximum three). The relay server managing part 13 registers the image forming device managed by the respective relay servers 8a, 8b and 8c within the set maximum number.

FIG. 3 is an example of the list information 17 managed by the relay server managing part 13. As illustrated in FIG. 3, the list information 17 includes information, the corresponding relay server, the accessible device and the managed device, and the information is associated with each other. The list information 17 shows that each of the relay servers 8a, 8b and 8c is allowed to establish communication with multiple image forming devices 7a to 7i. Also, the list information 17 shows that the relay server 8a manages the three image forming devices 7a, 7b and 7c, the relay server 8b manages the three image forming devices 7d, 7e and 7f, and the relay server 8c manages the three image forming devices 7g, 7h and 7i.

In response to receiving new notification information from the relay server 8a, for example, the relay server managing part 13 updates the list information 17 with the received notification information and extracts necessary information in the updated list information 17, then sending the extracted information to the relay server 8a. The relay server managing part 13, for example, extracts information relating to the image forming devices 7a, 7b and 7c that are managed by the relay server 8a and sends the extracted information to the relay server 8a. Also, the relay server managing part 13 extracts information relating to the other relay servers 8b and 8c that are allowed to establish communication with the image forming devices 7a, 7b and 7c managed by the relay server 8a and sends the extracted information to the relay server 8a. The information, however, should not be always extracted and sent. The relay server managing part 13 may send the whole list information 17 to the relay server 8a. As a result, the relay server 8a is allowed to have information as to the image forming device that should be managed by itself and information as to the other relay servers 8b and 8c that are allowed to establish communication with the image forming device that should be managed by itself. This process is performed when the relay server managing part 13 receives the new notification information from another relay server 8b or 8c.

The relay server managing part 13 notifies the application server 5 of the list of the image forming devices 7a to 7i with which the respective relay servers 8a, 8b and 8c are allowed to communicate based on the list information 17. Thus, the application server 5 is allowed to show the list of the multiple image forming devices 7a to 7i and receive designation of the device to which the job is output when receiving instructions such as the print instruction by the user.

The communication start request receiving part 14 monitors the information received via the communication interface 12, and receives the communication start request sent from the application server 5. In response to receiving the communication start request from the application server 5, the communication start request receiving part 14 brings the relay server identifying part 15 into operation.

The relay server identifying part 15 identifies one of the relay servers in response to receiving the communication start request from the application server 5. To be more specific, the relay server identifying part 15 reads the list information 17 in the storage unit 11 and identifies one of the relay servers which manages the image forming device designated with the communication start request from the application server 5. The image forming device 7a may be designated with the communication start request as the device to which the job is output, for example. In this case, the relay server identifying part 15 refers the list information 17 and identifies the relay server 8a which manages the image forming device 7a. The relay server identifying part 15 then brings the access request sending part 16 into operation.

The access request sending part 16 sends the access request to the relay server 8a identified by the relay server identifying part 15. This access request includes information relating to the image forming device 7a designated as the device to which the job is output and address information such as URL (Uniform Resource Locator) to access the application server 5. The access request sending part 16 establishes constant connection with the identified relay server 8a so that the access request sending part 16 sends the access request to the relay server 8a with this constant connection. Thus, the access request is not blocked by the firewall 4, and the relay server 8a is allowed to receive the request normally.

Figure 4:
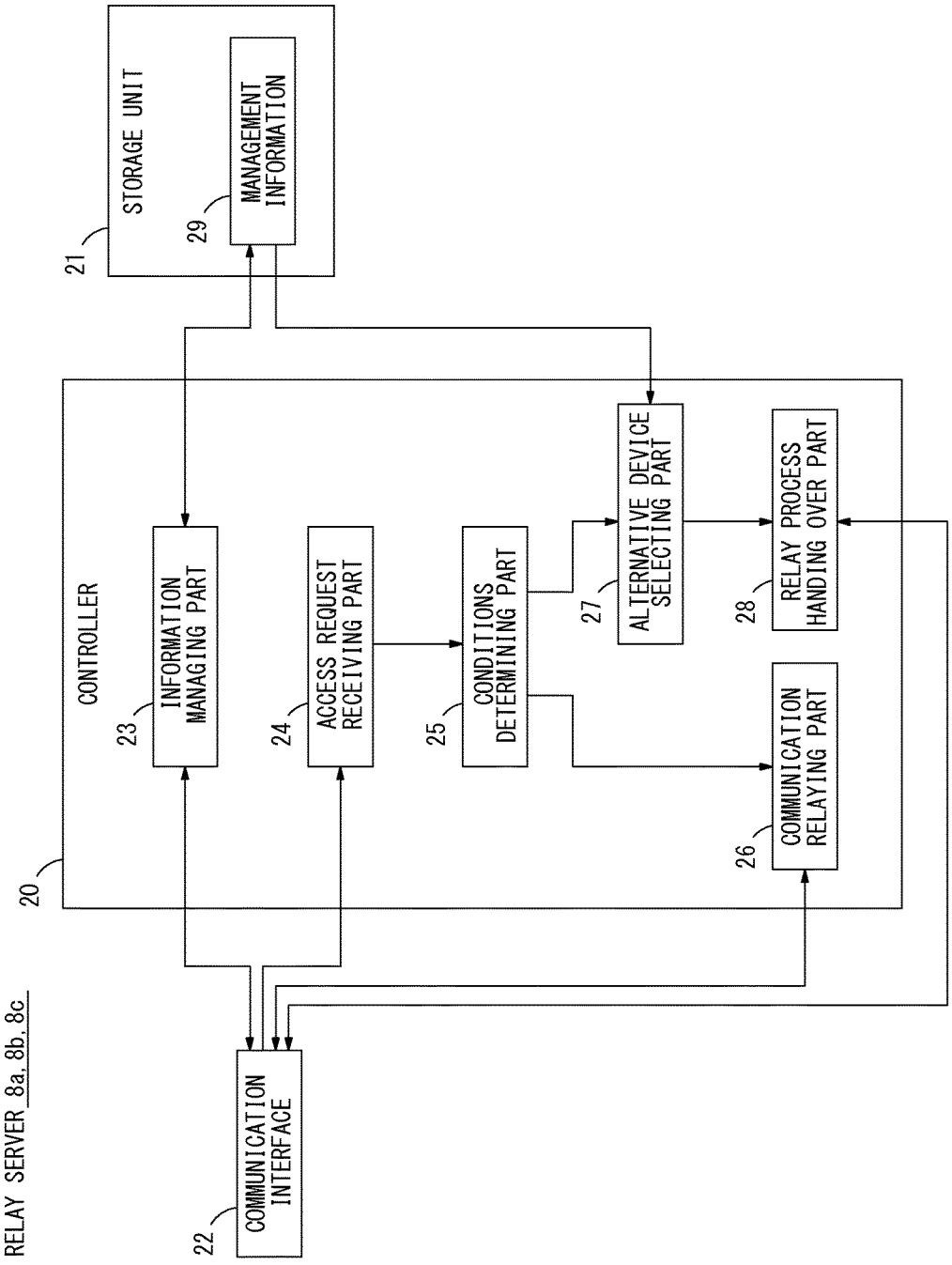
FIG. 4 is a block diagram showing an exemplary hardware configuration and functional configuration of a relay server.

The relay servers 8a, 8b and 8c are explained next. FIG. 4 is a block diagram showing an exemplary hardware configuration and functional configuration of the relay servers 8a, 8b and 8c. The relay server 8a is explained as an example hereafter; however it is the same for the other relay servers 8b and 8c. The relay server 8a includes a controller 20, a storage unit 21 and a communication interface 22. The controller 20 is formed from a CPU and a memory, and the storage unit 21 is formed from a device such as a hard disk drive (HDD). The communication interface 22 establishes communication over the local network 3. The CPU executes a predetermined program stored in advance in the storage unit 21 so that the controller 20 serves as an information managing part 23, an access request receiving part 24, a conditions determining part 25, a communication relaying part 26, an alternative device selecting part 27 and a relay process handing over part 28.

The information managing part 23 acquires the list information 17 from the connection mediation server 6 at the regular basis and generates management information 29 including information relating to the image forming devices 7a, 7b and 7c that should be managed by itself and information relating to other relay servers 8b and 8c. The information managing part 23 stores and manages the management information 29 in the storage unit 21. The information managing part 23 establishes constant connection with the connection mediation server 6 in response to being powered on. The information managing part 23 then searches for the image forming device with which it is allowed to establish communication at a regular basis and notifies the connection mediation server 6 of the search result. When notifying the connection mediation server 6 of the search result, the information managing part 23 obtains the latest list information 17 from the connection mediation server 6 and updates the management information 29.

FIG. 5 is an example of the management information 29 managed by the information managing part 23. As illustrated in FIG. 5, the management information 29 includes information, the managed device, the accessible server and an address of the accessible server associated with each other. In the example of FIG. 5, the management information 29 shows that three image forming devices 7a, 7b and 7c are registered as the managed devices. The relay servers 8b and 8c are registered as the servers capable of establishing communication with each of the image forming devices 7a, 7b and 7c. Also, the addresses of the relay servers 8b and 8c are registered.

In response to receiving the necessary information extracted from the list information 17 stored on the connection mediation server 6, for example, the information managing part 23 updates the management information 29 with the received information. If the list information 17 stored on the connection mediation server 6 is received as it is, the information managing part 23 identifies the image forming devices 7a, 7b and 7c those should be managed by the relay server 8a based on the received list information 17. Also, the information managing part 23 identifies the other relay servers 8b and 8c that are capable of establishing communication with the image forming devices 7a, 7b and 7c, and registers with the management information 29. The information managing part 23 establishes communication with the connection mediation server 6 every certain time such as every few minutes, for instance.

The access request receiving part 24 monitors the information received via the communication interface 22, and receives the access request sent from the connection mediation server 6. After receiving the access request from the connection mediation server 6, the access request receiving part 24 brings the conditions determining part 25 into operation.

The conditions determining part 25 determines whether or not the operating conditions of its device is busy. More specifically, it determines the device is busy when any value of CPU utilization, memory utilization on its device or the number of addresses with which the device is establishing communication exceeds a predetermined reference value. If the device is not busy, the device may be in a standby state in which the device is allowed to perform the relay process of the communication between the application server 5 and the image forming device 7a designated as the address to which the job is output. When it is determined that the device is not busy and is in the standby state, the conditions determining part 25 brings the communication relaying part 26 into operation.

The communication relaying part 26 relays the communication between the application server 5 and the image forming device 7a designated as the address to which the job is output based on the access request received by the access request receiving part 24. To be more specific, the communication relaying part 26 establishes connection with the application server 5 over the internet 2 with the address information included in the access request, then receives the data from the application server 5. In response to receiving the data, the communication relaying part 26 sends the received data to the image forming device 7a designated as the address to which the job is output with the access request. After the transmission of the data from the application server 5 to the image forming device 7a, the communication relaying part 26 terminates the connection with the application server 5.

When determining the device is busy at the time of the receipt of the access request, the conditions determining part 25 brings the alternative device selecting part 27 into operation. The alternative device selecting part 27 selects the other relay servers 8b and 8c which are capable of performing the process requested by the connection mediation server 6 as alternative devices. The process requested by the connection mediation server 6 is the process to relay the communication between the application server 5 and the image forming device 7a designated as the address to which the job is output. The alternative device selecting part 27 identifies the image forming device 7a designated as the address to which the job is output based on the access request received by the access request receiving part 24, and reads and refers the management information 29 in the storage unit 21, thereby selecting the other relay servers 8b and 8c which are capable of establishing communication with the image forming device 7a designated as the address to which the job is output as the alternative devices.

No relay server which is capable of establishing communication with the image forming device designated as the address to which the job is output may not be registered with the management information 29. In such a case, the alternative device selecting part 27 is not allowed to select any alternative device. When no alternative device is selected, the alternative device selecting part 27 brings the communication relaying part 26 into operation to make the relay server 8a perform the process to relay the communication between the image forming device 7a designated as the address to which the job is output and the application server 5.

The alternative device selecting part 27 selects at least one of the other relay servers as the alternative device. In this case, the alternative device selecting part 27 brings the relay process handing over part 28 into operation. The relay process handing over part 28 sends an alternating request to at least one of the other relay servers selected as the alternative device. The relay process handing over part 28 then alternates the relay process of the communication between the image forming device 7a designated as the address to which the job is output and the application server 5 to another relay server. The alternating request sent by the relay process handing over part 28 includes address information to access the image forming device 7a designated as the address to which the job is output and address information to access the application server 5. In response to receiving the alternating request from the relay server 8a, the relay servers 8b and 8c are allowed to perform the relay process of the communication between the image forming device 7a designated as the address to which the job is output and the application server 5 instead of the relay server 8a.

Even when the relay process handing over part 28 sends the alternating request, another relay server received the alternating request may refuse to perform the alternating process. Another relay server received the alternating request may have already been busy at the time of the receipt of the alternating request, for example. In this case, another relay server received the alternating request returns a refusal notification in response to the alternating request. If there is still another alternative relay server, the relay process handing over part 28 sends the alternating request to another alternative relay server. When receiving an acceptance notification as a response to the alternating request from another alternative relay server, the process to hand over the relay process of the communication between the image forming device 7a designated as the address to which the job is output and the application server 5 to another relay server is complete. All the alternative servers selected by the alternative device selecting part 27 may return the refusal notifications. In such a case, the relay process handing over part 28 brings the communication relaying part 26 into operation to make the relay server 8a perform the process to relay the communication between the image forming device 7a designated as the address to which the job is output and the application server 5.

Figure 6:
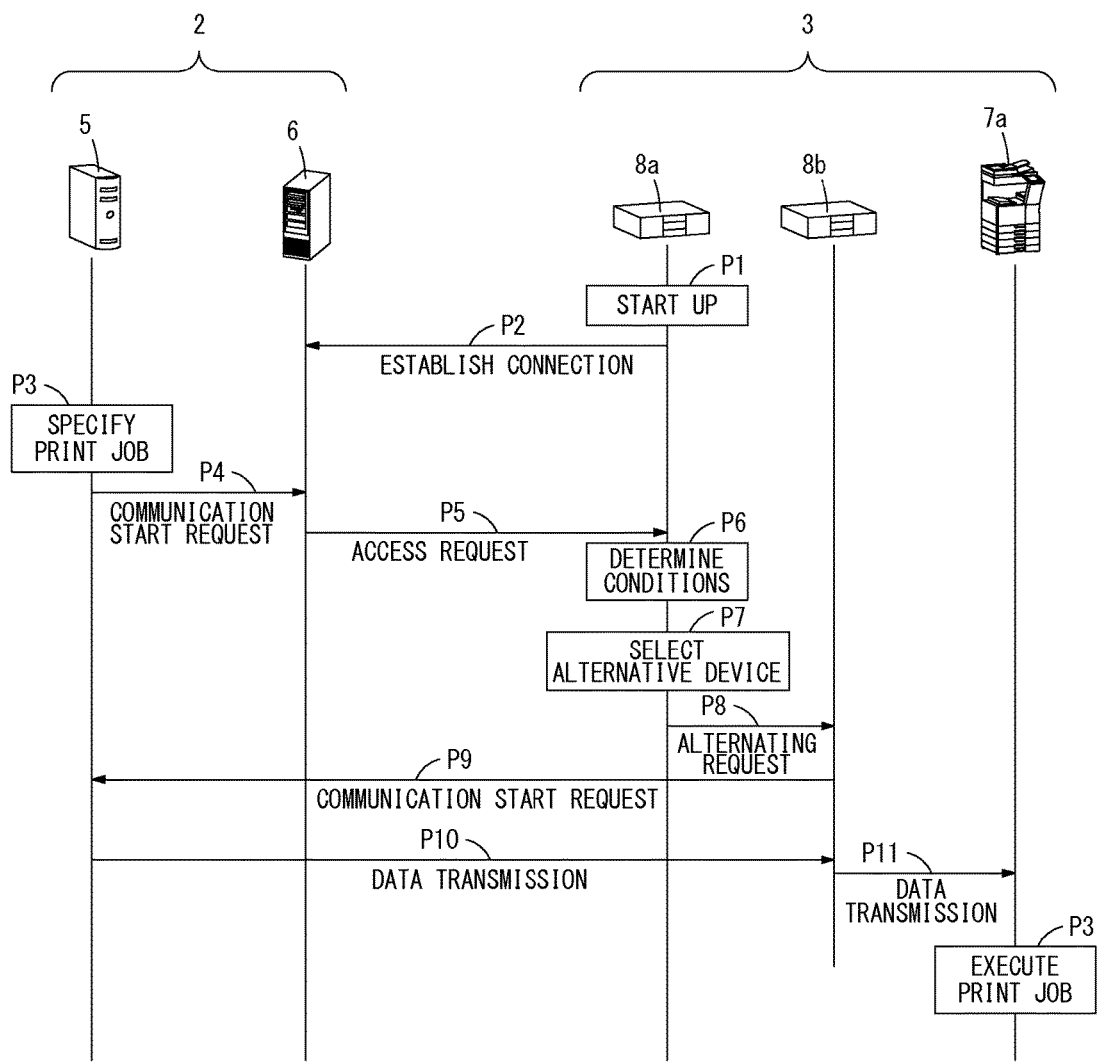
FIG. 6 is a flow diagram explaining each exemplary sequential procedure performed when the relay server hands over an alternating process to another relay server to execute a print job.

FIG. 6 is a flow diagram explaining each exemplary sequential procedure performed when the relay server 8a hands over the alternating process to another relay server 8b to execute the print job. After the relay server 8a is powered on (process P1), the relay server 8a establishes the constant connection with the connection mediation server 6 (process P2). As a result, the connection mediation server 6 is allowed to send the access request to the relay server 8a at any time. After the print job with which the image forming device 7a is designated as the address to which the job is output is given in the application server 5 (process P3), the application server 5 sends the communication start request to the connection mediation server 6 (process P4). In response to receiving the communication start request, the connection mediation server 6 identifies the relay server 8a which manages the image forming device 7a and sends the access request to the identified relay server 8a (process P5). The relay server 8a may be busy when it receives the access request from the connection mediation server 6. In this case, the relay server 8a sends the alternating request to another relay server 8b which is allowed to establish communication with the image forming device 7a designated as the address to which the job is output (process P8). The relay server 8b received the alternating request may not be busy. In this case, the relay server 8b accepts the alternating request and sends the communication start request to the application server 5 instead of the relay server 8a (process P9). Thus, the application server 5 establishes the connection with the relay server 8b, then starts data transmission to the relay server 8b (process P10). In response to receiving the data, the relay server 8b sends the data to the image forming device 7a designated as the address to which the job is output (process P11). After the data transmission, the image forming device 7a executes the given print job (process P12).

Figure 7:
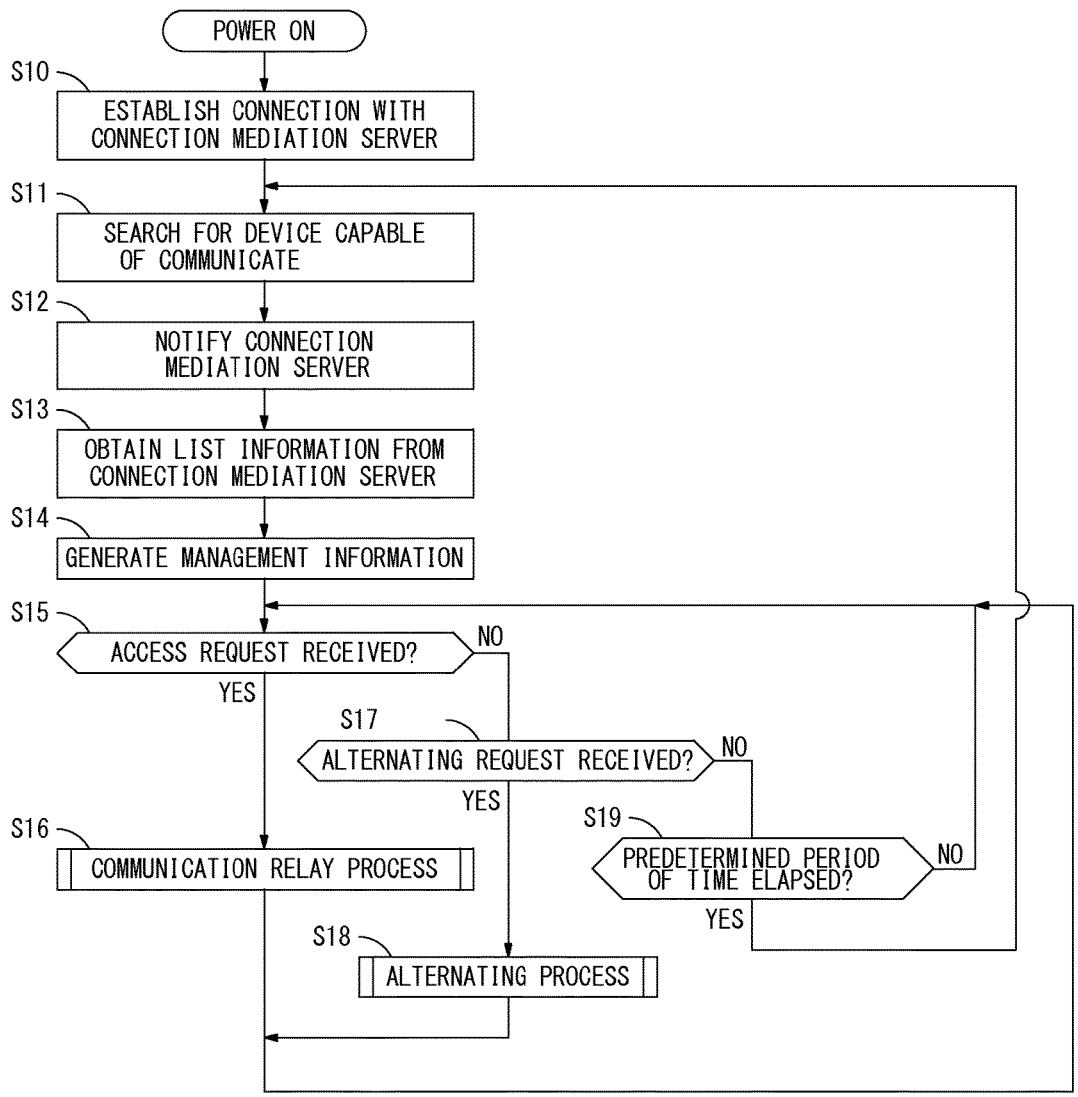
FIG. 7 is a flow diagram explaining an exemplary sequential procedure of the process performed on the relay server of a first preferred embodiment.
Figure 8:
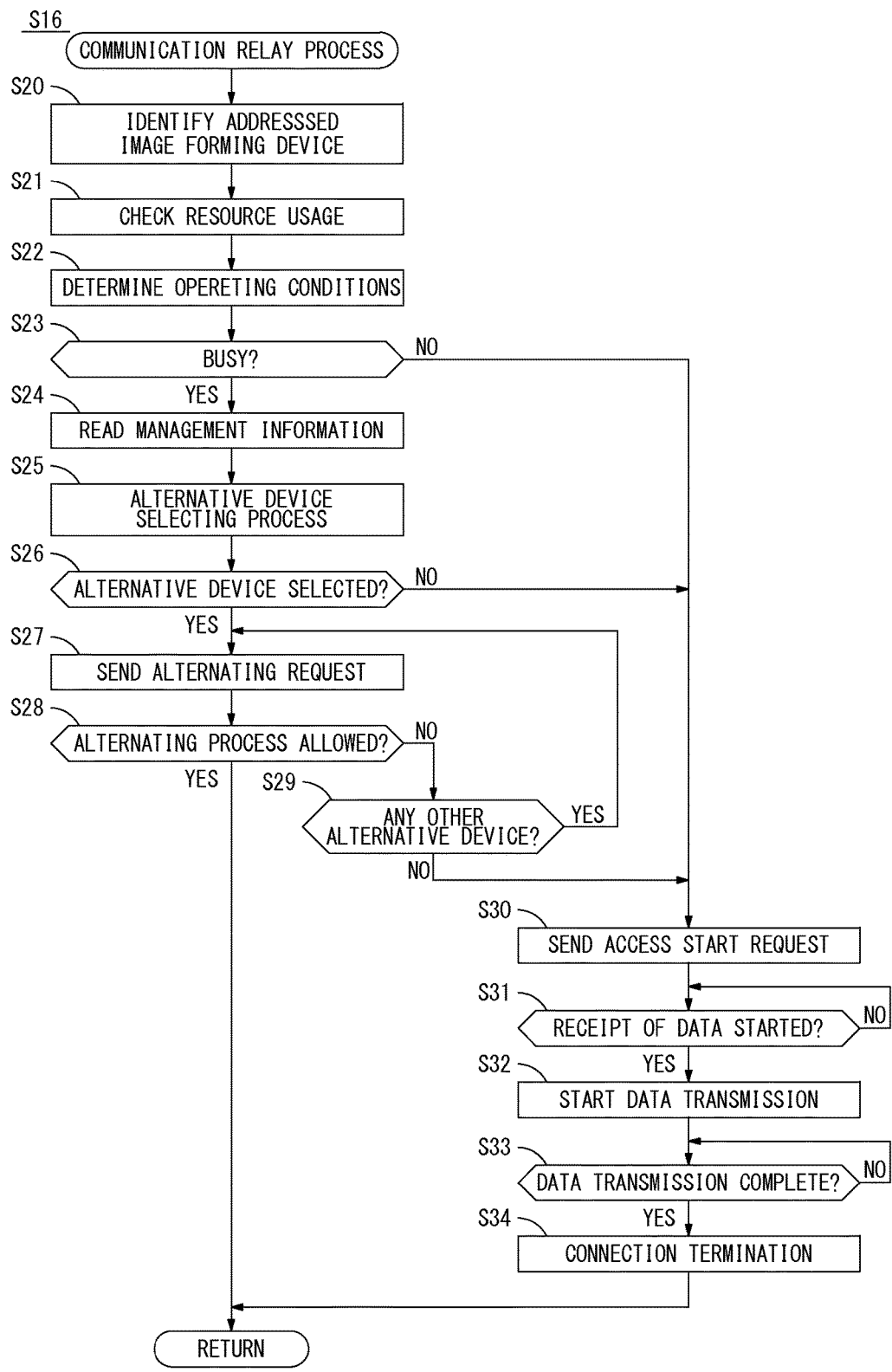
FIG. 8 is a flow diagram explaining the detailed exemplary sequential procedure of a communication relay process.
Figure 9:
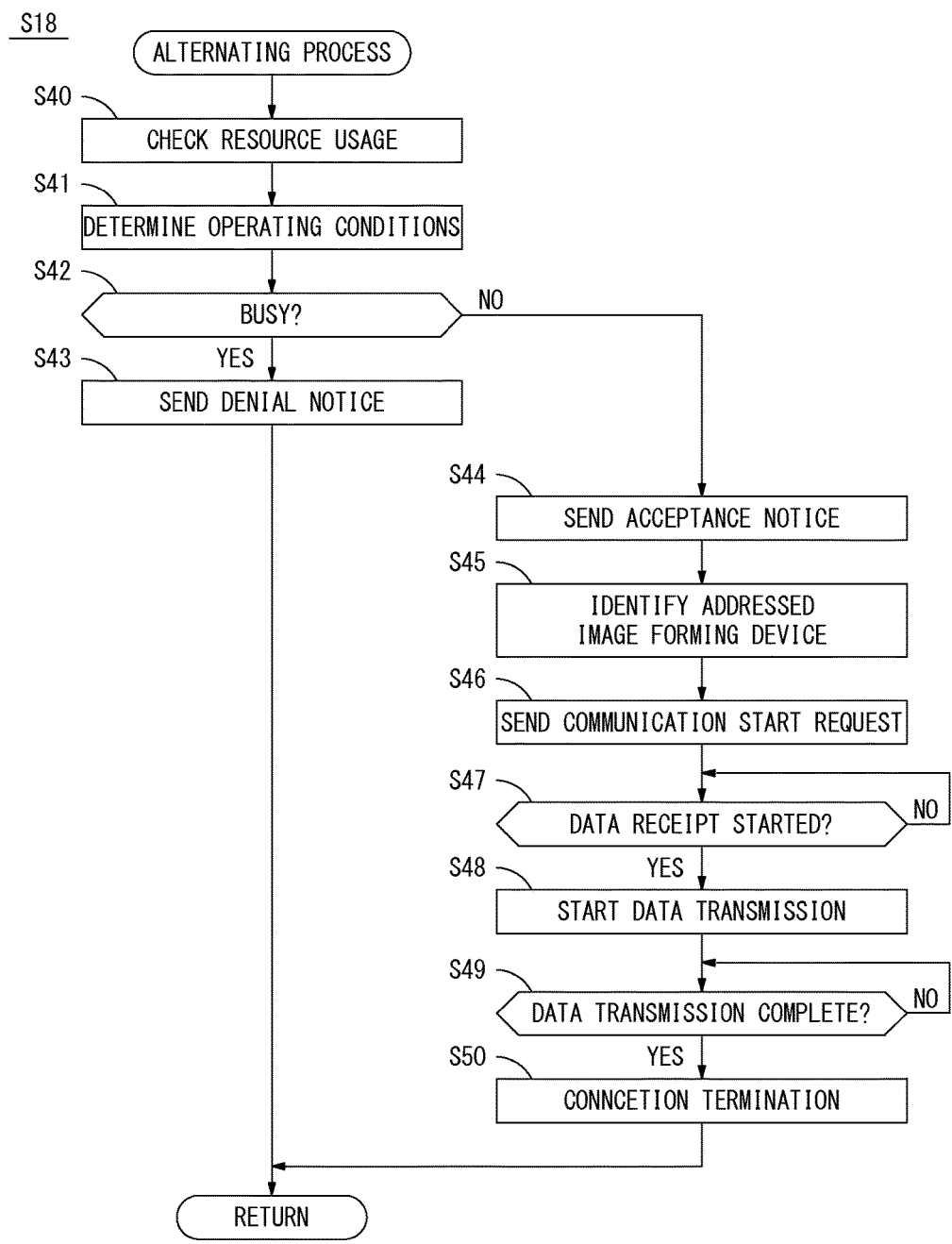
FIG. 9 is a flow diagram explaining the detailed exemplary sequential procedure of the alternating process.

FIGS. 7, 8 and 9 are flow diagrams explaining exemplary sequential procedures of the process performed on each relay server 8a, 8b and 8c. Each flow when the corresponding process is performed on the relay server 8a is explained below as an example. The same flow is performed when each process is performed on another relay server 8b or 8c. After the relay server 8a is powered on, it establishes the connection with the connection mediation server 6, and maintains the connection until it is powered off (step S10). After the connection with the connection mediation server 6 is established, the relay server 8a searches for the image forming device with which it is allowed to establish communication within the local network 3 (step S11). The relay server 8a then notifies the connection mediation server 6 of the search result (step S12). With the step S12, the relay server 8a obtains whole or a part of the list information 17 from the connection mediation server 6 (step S13), and generates the management information 29 and stores (step S14).

The relay server 8a determines whether or not the access request is received from the connection mediation server 6 (step S15). When it determines that the access request is received (when a result of step S15 is YES), the relay server 8a performs a communication relay process (step S16). The detail of the communication relay process is explained later. After the communication relay process, the relay server 8a repeats the process after step S15.

When it determines that the access request is not received (when a result of step S15 is NO), the relay server 8a determines whether or not the alternating request is received from the relay server 8b or 8c (step S17). When it determines that the alternating request is received (when a result of step S17 is YES), the relay server 8a performs the alternating process (step S18). The detail of the alternating process is explained later. After the alternating process, the relay server 8a repeats the process after step S15.

When the alternating request is not received (when a result of step S17 is NO), the relay server 8a determines if a predetermined period of time has been elapsed after conducting the search in step S11 (step S19). If the predetermined period of time has not been elapsed (when a result of step S19 is NO), the relay server 8a repeats the process after step S15, and waits for the receipt of the access request or the alternating request. If the predetermined period of time has been elapsed (when a result of step S19 is YES), the relay server 8a returns to the process in step S11 and repeats the process after step S11.

FIG. 8 is a flow diagram explaining the detailed exemplary sequential procedure of the communication relay process (step S16). Upon the start of this process, the relay server 8a identifies the image forming device 7a designated as the address to which the job is output based on the information included in the access request (step S20). The relay server 8a then checks resource usage such as the CPU or the memory (step S21), and determines the operating conditions of its device (step S22). When determining that the device is busy (when a result of step S23 is YES), the relay server 8a reads the management information 29 (step S24), and performs the process to select another relay server which is allowed to establish communication with the image forming device 7a designated as the address to which the job is output as the alternative device (step S25). The relay server 8a then determines whether or not any alternative device is selected (step S26). If any alternative device is selected (when a result of step S26 is YES), the relay server 8a sends the alternating request to the selected alternative device (step S27). If more than one relay server is selected as the alternative device, the relay server 8a sends the alternating request to one of more than one relay server. The relay server 8a determines whether or not the alternating process is performed on another relay serve thereby selected as the alternative device based on the response to the alternating request (step S28). When the alternating process is performed (when a result of step S28 is YES), the relay server 8a completes the communication relay process.

When the alternating process is not performed on another relay server to which the alternating request is sent (when a result of step S28 is NO), the relay server 8a determines if there is any other alternative device (step S29). If there is another alternative device (when a result of step S29 is YES), the relay server 8a returns to the process in step S27 to send the alternating request to another alternative device.

When the relay server 8a determines that the device is not busy in step S23, when no alternative device is selected in step S26, or when there is no other alternative device in step S29, the process performed by the relay server 8a moves on to step S30. The relay server 8a sends the access start request to the application server 5 in response to the access request received from the connection mediation server 6 (step S30). The application server 5 then establishes connection with the relay server 8a to start data transmission such as document data. After the connection between the application server 5 and the relay server 8a is established, the relay server 8a determines whether or not the data is received from the application server 5 (step S31). In response to starting the data transmission (when a result of step S31 is YES), the relay server 8a starts the process to send the received data to the image forming device 7a designated as the device to which the job is output (step S32). After the data transmission (when a result of step S33 is YES), the relay server 8a terminates the connection with the application server 5 (step S34), and completes the communication relay process.

Through this communication relay process, the relay server 8a sends the alternating request to the other relay servers 8b and/or 8c if the operating conditions of its device is busy when receiving the access request from the connection mediation server 6. If another relay server 8b or 8c is not busy, the relay server 8a is allowed to alternate another relay server 8b or 8c the relay process of communication between the image forming device 7a designated as the address to which the job is output and the application server 5. As a result, rapid data transmission may be realized without having extreme reduction of communication efficiency between the image forming device 7a designated as the address to which the job is output and the application server 5. For alternating the relay process which should be performed by the relay server 8a to another relay server 8b or 8c, communication between the relay server 8a and the connection mediation server 6 never goes over the internet 2. As a result, the relay process may be handed over efficiently and the time until start of the data transmission by the application server 5 can be shortened.

FIG. 9 is a flow diagram explaining the detailed exemplary sequential procedure of the alternating process (step S18). Upon the start of the process, the relay server 8a checks the resource usage such as the CPU or the memory (step S40), and determines the operating conditions of its device (step S41). When determining that the device is busy (when a result of step S42 is YES), the relay server 8a sends a denial notice to another relay server 8b or 8c, the sender of the alternating request (step S43), then completes the alternating process.

When the device is not busy (when a result of step S42 is NO), the relay server 8a sends the acceptance notice to another relay server 8b or 8c, the sender of the alternating request (step S44). The relay server 8a identifies the image forming devices 7d to 7i designated as the address to which the jobs are output based on the information included in the alternating request (step S45). Also, the relay server 8a sends the communication start request to the application server 5 based on the information included in the alternating request (step S46). Thus, the application server 5 is allowed to establish connection with the relay server 8a and start data transmission such as the document data. In response to establishing connection with the application server 5, the relay server 8a determines if the data from the application server 5 is received (step S47). After starting the data transmission (when a result of step S47 is YES), the relay server 8a starts the process to send the received data to the image forming devices 7d to 7i designated as the address to which the jobs are output (step S48). After the data transmission (when a result of step S49 is YES), the relaying server 8a terminates the connection with the application server 5 (step S50) and completes the communication relay process.

Through this communication relay process, the relay server 8a performs the relay process to relay the communication between one of the image forming devices 7d to 7i designated as the address to which the job is output and the application server 5 instead of another relay server 8b or 8c if it is not busy when receiving the alternating request from another relay server 8b or 8c. As a result, rapid data transmission may be realized without having extreme reduction of communication efficiency between one of the image forming devices 7d to 7i designated as the address to which the job is output and the application server 5. When the relay server 8a relays the communication with the application server 5 instead of another relay server 8b or 8c, the communication between the relay server 8a and the connection mediation server 6 never goes over the internet 2. As a result, the relay process may be handed over efficiently and the time until start of the data transmission by the application server 5 can be shortened.

As described above on the image forming system 1 of the first preferred embodiment, when each relay server 8a, 8b and 8c receives the access request from the connection mediation server 6, it determines if the device is busy or not. If the device is busy, the relay servers 8a, 8b and 8c are not allowed to transmit data from the application server 5 efficiently. When it is determined the device is busy, one or more relay server which is allowed to establish communication with the image forming device designated as the address to which the job is output is selected as the alternative device from among the multiple relay servers. Another relay server may be selected as the alternative device. In such a case, the alternating request is sent to the alternative device, and the relay process to relay the communication between the image forming device designated as the address to which the job is output and the application server 5 may be alternated to the alternative device. To be more specific, one of the multiple relay servers 8a, 8b and 8c may receive the access request from the connection mediation server 6. In this case, another relay server which is not busy may be selected, and another relay server is caused to perform the relay process. Another relay server which is not busy should be allowed to send the data from the application server 5 efficiently. As a result, extreme reduction of data transmission efficiency between the application server 5 and the image forming device designated as the address to which the job is output may be controlled, resulting in the system having a higher user-friendliness than conventional ones. When each relay server 8a, 8b and 8c hands over the relay process of the communication with the application server 5 to another relay server, communication never goes over the internet 2. As a result, the process may be handed over efficiently to another relay server.

As described above, the process of relaying the communication between the application server and the image forming device efficiently to another relay server without any communication over the internet when the relay server is busy.

Second Preferred Embodiment

A second preferred embodiment is described next. In the above-described first preferred embodiment, when each relay server 8a, 8b and 8c selects the alternative device, more than one relay server may be selected as the alternative device. In such a case, the alternating request is sent to the more than one relay server one after the other. Thus, it may take a while to find another relay server which is capable of alternating the relay process. According to the second preferred embodiment, another relay server which is capable of alternating the relay process is allowed to be found more efficiently. The configuration of the image forming system 1 of the second preferred embodiment is the same as the one of the first preferred embodiment.

Figure 10:
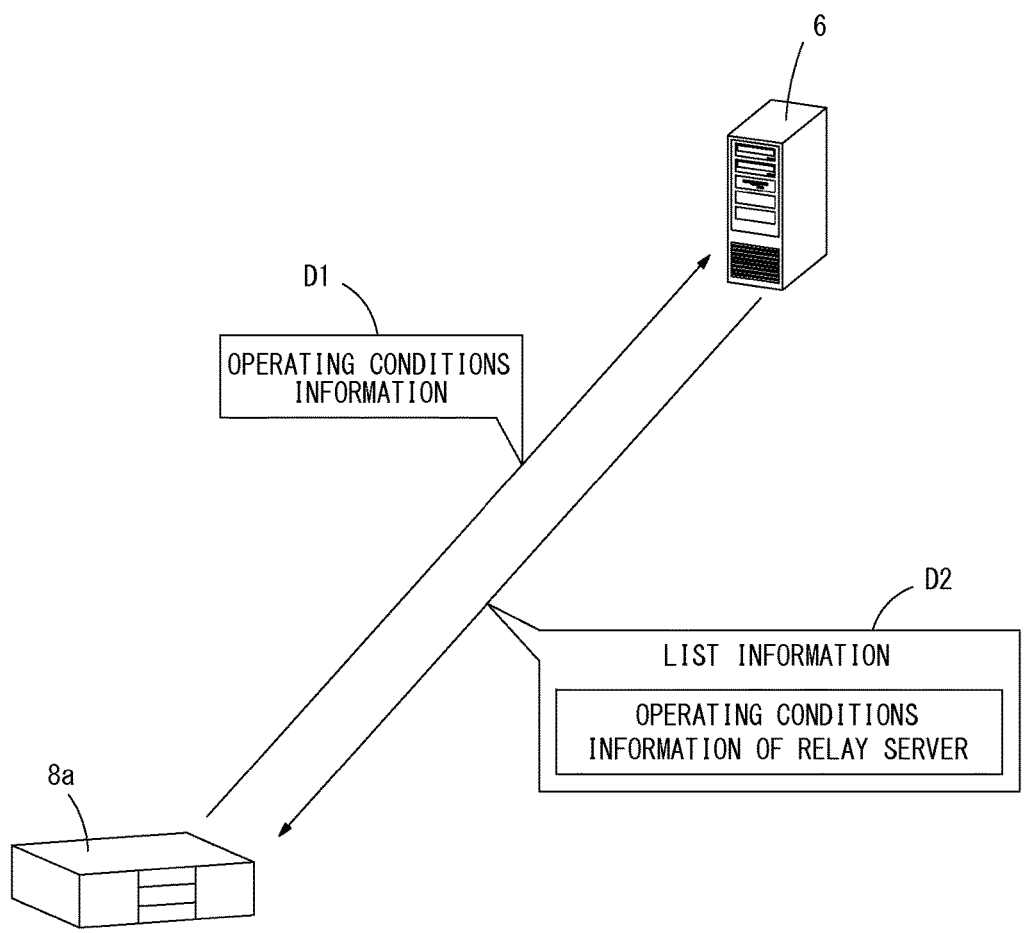
FIG. 10 shows an exemplary communication established between the relay server and the connection mediation server at a regular basis in a second preferred embodiment.

FIG. 10 shows an exemplary communication established between the relay server 8a and the connection mediation server 6 at a regular basis in the second preferred embodiment. As illustrated in FIG. 10, the relay server 8a sends the information relating to the image forming device with which it is allowed to establish communication to the connection mediation server 6 at a regular basis. For sending the information, the relay server 8a checks the operating conditions of its device and sends operating conditions information D1 showing whether or not the device is busy. The connection mediation server 6 registers the operating conditions of the relay server 8a with the list information 17 based on the operating conditions information D1 received from the relay server 8a.

FIG. 11 is an example of the list information 17 managed by the connection mediation server 6 of the second preferred embodiment. As shown in FIG. 11, the operating conditions of the respective relay servers 8a, 8b and 8c are registered with the list information 17 of the second preferred embodiment. In response to sending the operating conditions information D1 as shown in FIG. 10, the relay server 8a obtains whole or a part of information D2 in the list information 17 from the connection mediation server 6. For obtaining the information D2, the relay server 8a at least obtains the operating conditions information relating to the other relay servers 8b and 8c which are allowed to establish communication with the image forming devices 7a, 7b and 7c those should be managed by the relay server 8a. The relay server 8a then registers the operating conditions information relating to the other relay servers 8b and 8c with the management information 29. The same process is performed when the other relay servers 8b and 8c establish communication with the connection mediation server 6 at a regular basis.

FIG. 12 is an example of the management information 29 managed by the relay server 8a. As shown in FIG. 12, the operating conditions of the respective other relay servers 8b and 8c which are allowed to establish communication with the image forming devices 7a, 7b and 7c that are managed by the relay server 8a are registered with the management information 29 of the second preferred embodiment. The communication regularly established between each relay server 8a, 8b and 8c and the connection mediation server 6 is established every predetermined period of time such as about several minutes, for instance. Thus, the operating conditions of the respective other relay servers 8b and 8c several minutes ago are registered with the management information 29. This process is the same for the other relay servers 8b and 8c.

When the relay server 8a receives the access request from the connection mediation server 6, the relay server 8a may be busy. In this case, the relay server 8a selects the other relay servers 8b and 8c which are allowed to establish communication with the image forming device 7a designated as the address to which the job is output as the alternative devices and sends the alternating request to one of the alternative devices. More than one relay server 8b and 8c may be selected as the alternative devices. In such a case, the relaying handing over part 28 of the relay server 8a refers the management information 29, thereby sending the alternating request to the relay server 8c first. The alternating request is sent to the relay server 8c first because the relay server 8c of the more than one relay server 8b and 8c selected as the alternative device is not busy. It is assumed, for example, the management information 29 on the relay server 8a shows as it is in FIG. 12. In this case, the relaying handing over part 28 of the relay server 8a sends the alternating request to the relay server 8c first as the relay server 8c of two relay servers 8b and 8c selected as the alternative device is not busy.

Figure 13:
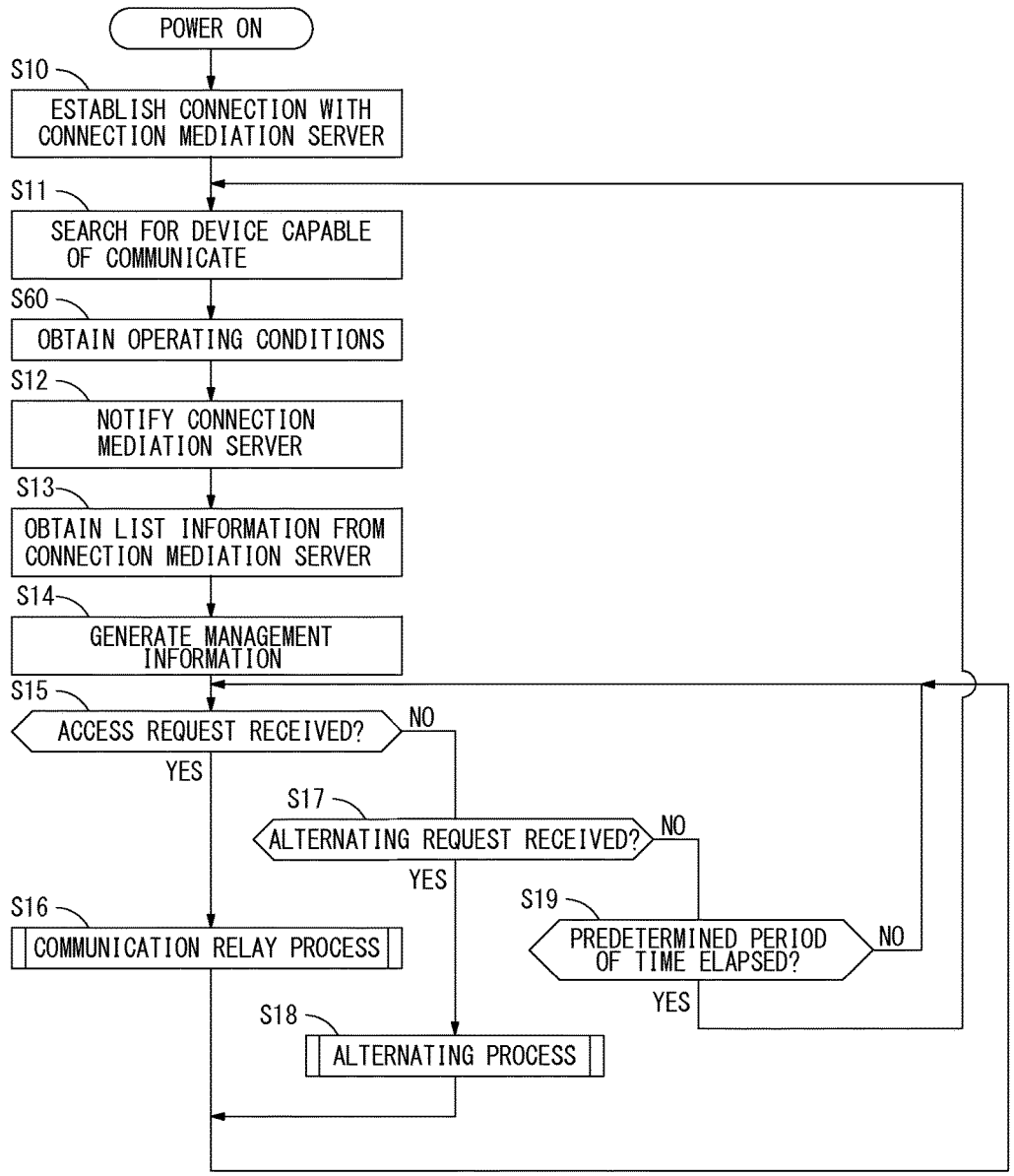
FIG. 13 is a flow diagram explaining an exemplary sequential procedure performed on the relay server of the second preferred embodiment.
Figure 14:
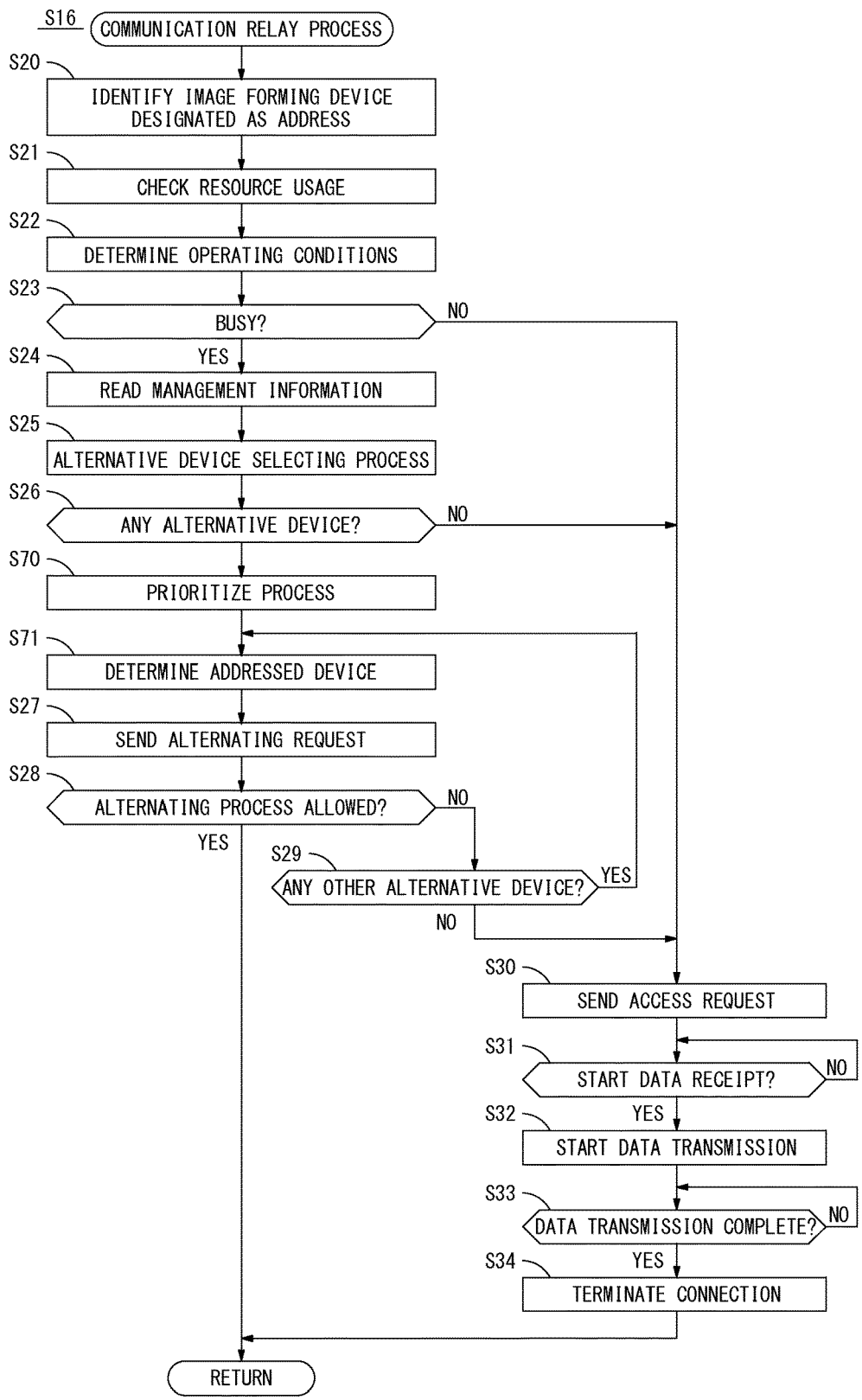
FIG. 14 is a flow diagram explaining the detailed exemplary sequential procedure of the communication relay process of the second preferred embodiment.

FIGS. 13 and 14 are flow diagrams explaining an exemplary sequential procedure performed by each relay server 8a, 8b and 8c of the second preferred embodiment. The exemplary sequential procedure shown in FIG. 13 has a process in step S60 between the steps S11 and S12, which is different from the exemplary sequential procedure of FIG. 7. To be more specific, after searching for the image forming device with which it is allowed to establish communication (step S11), each relay server 8a, 8b and 8c checks the operating conditions of its device, and obtains the operating conditions information (step S60). For notifying the connection mediation server 6 of the search result of the image forming device with which it is allowed to establish communication, each relay server 8a, 8b and 8c sends the operating conditions information together with the search result (step S12). As a result, for establishing communication with the connection mediation server 6 at a regular basis, each relay server 8a, 8b and 8c is allowed to send the operating conditions information which shows the operating conditions of the respective devices to the connection mediation server 6.

FIG. 14 is a flow diagram explaining the detailed exemplary sequential procedure of the communication relay process (step S16) of the second preferred embodiment. The exemplary sequential procedure shown in FIG. 14 has process in steps S70 and S71 between the steps S26 and S27, which is different from the exemplary sequential procedure of FIG. 8. To be more specific, each relay server 8a, 8b and 8c may select another relay server as the alternative server as the respective devices are busy (when a result of step S26 is YES). In such a case, each relay server 8a, 8b and 8c performs a prioritize process (step S70). More specifically, if each relay server 8a, 8b and 8c selects more than one relay server as the alternative device, each relay server 8a, 8b and 8c determines the operating conditions of each of more than one relay server based on the management information 29. Another relay server which is not busy is given high-priority, and another relay server which is busy is given low-priority.

After prioritizing all the relay servers selected as the alternative device, each relay server 8a, 8b and 8c determines the relay server as the address to which the alternating request is sent based on the order of priority determined in step S70 (step S71). To be more specific, the more than one relay server is determined as the address to which the alternating request is sent in descending order of priorities. So, the relay server having the highest-priority is determined as the address to which the alternating request first. Each relay server 8a, 8b and 8c sends the alternating request to one of more than one relay server determined as the address to which the alternating request (step S27). As a result, another relay server which is capable of performing the alternating process may be found rapidly. The operating conditions of the respective other relay servers registered with the management information 29, however, show the operating conditions several minutes ago. The operating conditions may be changed to busy when the alternating request is sent. More specifically, even though the alternating request is sent to the relay server which has a high-priority, the alternating process may not be performed on the relay server. When the alternating process is not performed on the relay server to which the alternating request is sent, each relay server 8a, 8b and 8c again performs the process in S71 to determine the relay server which has higher-priority as the address to which the alternating request, then sends the alternating request to the determined relay server. Each relay server 8a, 8b and 8c repeats the process. As repeating the process, if the relay server which was busy few minutes ago, for instance, had become standby state, the relay server may be found.

The alternating process (step S18) performed on the respective relay servers 8a, 8b and 8c of the second preferred embodiment is the same as that of FIG. 9.

The relay server 8a, 8b or 8c may select more than one relay server as the alternative device as the device is busy when it receives the access request from the connection mediation server 6. In this case, the relay server 8a, 8b or 8c of the image forming system 1 of the second preferred embodiment sends the alternating request to one of more than one relay server which is not busy first. In sending the alternating request to the more than one relay server which is selected as the alternative device one after the other, another relay server which is capable alternating the relay process of the communication with the application server 5 may be found promptly. Especially for the local network 3 on which many relay servers are established, another relay server which is capable alternating the relay process may be found in a short time, resulting in improvement in process efficiency.

When the relay server 8a, 8b or 8c sends the alternating request to more than one relay server selected as the alternative device one after the other, communication never goes with the connection mediation server 6 over the internet 2. As a result, the relay server which is capable of alternating the relay process is allowed to be found more efficiently than the conventional systems.

Everything other than the above-described points are the same as what explained in the first preferred embodiment.

Third Preferred Embodiment

A third preferred embodiment is described next. In the above-described second preferred embodiment, the connection mediation server 6 manages all information of the operating conditions of the respective relay servers 8a, 8b and 8c. When each relay server 8a, 8b and 8c accesses the connection mediation server 6 at a regular basis, it obtains the operating conditions information relating to the other relay servers from the connection mediation server 6. More specifically, for obtaining the operating conditions information relating to the other relay servers, it is required for each relay server 8a, 8b and 8c to establish communication over the internet 2. According to the third preferred embodiment, each relay server 8a, 8b and 8c obtains the operating conditions information relating to the other relay servers without any communication over the internet 2.

Figure 15:
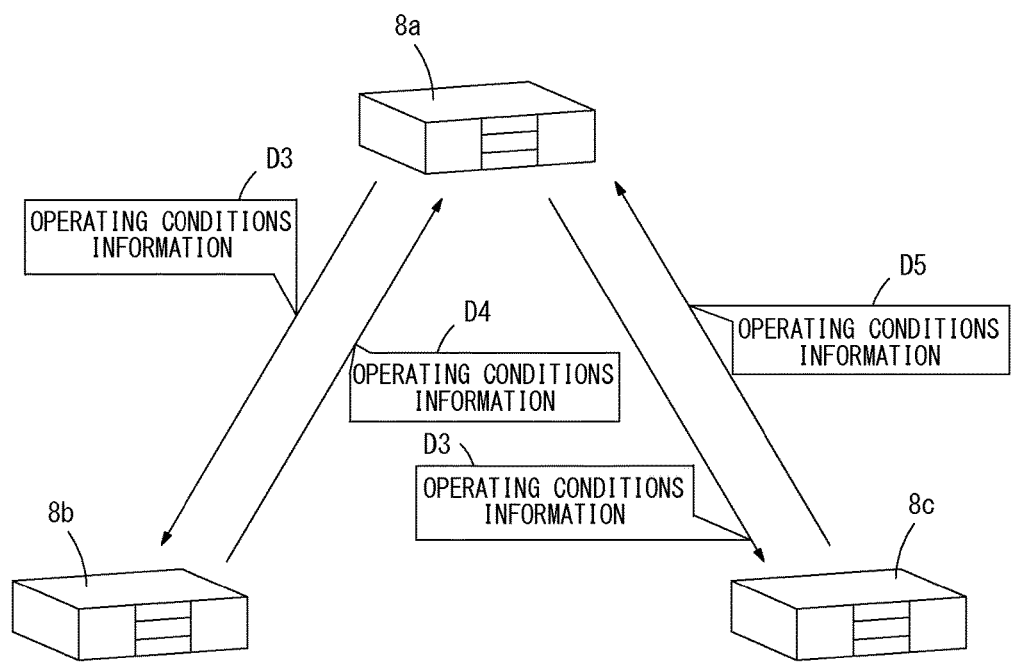
FIG. 15 is an example for the relay server to obtain operating conditions information of the other relay servers of a third preferred embodiment.

In the third preferred embodiment, each relay server 8a, 8b and 8c exchanges the operating conditions information in the local network 3 with each other, so that every relay server is allowed to obtain each other's operating conditions information. FIG. 15 is an example for the relay server 8a to obtain the operating conditions information of the other relay servers 8b and 8c. The relay server 8a notifies the connection mediation server 6 at a regular basis of the search result of the image forming device with which it is allowed establish communication. Together with informing of the search result, the relay server 8a checks its operation conditions and generates operating conditions information D3, then sends the operating conditions information D3 to the other relay servers 8b and 8c with communication in the local network 3. The relay server 8a is only required to send the operating conditions information D3 to the other relay servers 8b and 8c which are allowed to establish communication with the image forming devices 7a, 7b and 7c which should be managed by the relay server 8a. Some relay servers in the local network 3 are not allowed to establish communication with the image forming devices 7a, 7b and 7c which should be managed by the relay server 8a, for example. In this case, the relay server 8a does not send the operating conditions information D3 to such relay servers.

In response to sending the operating conditions information D3 to the other relay servers 8b and 8c, the relay server 8a obtains operating conditions information D4 and D5 from the respective other relay servers 8b and 8c and registers the obtained information with the management information 29. Thus, the relay server 8a is allowed to have information relating to the operating conditions of the other relay servers 8b and 8c which are allowed to establish communication with the image forming devices 7a, 7b and 7c which are managed by the relay server 8a without having any communication over the internet 2. The exchange of the operating conditions information D3, D4 and D5 with each other is carried out by the respective relay servers 8a, 8b and 8c at a regular basis. Each relay server 8a, 8b and 8c updates the operating conditions of the other relay servers which are allowed to establish communication with the image forming device which is managed by the relay server 8a, and registers with the management information 29.

Figure 16:
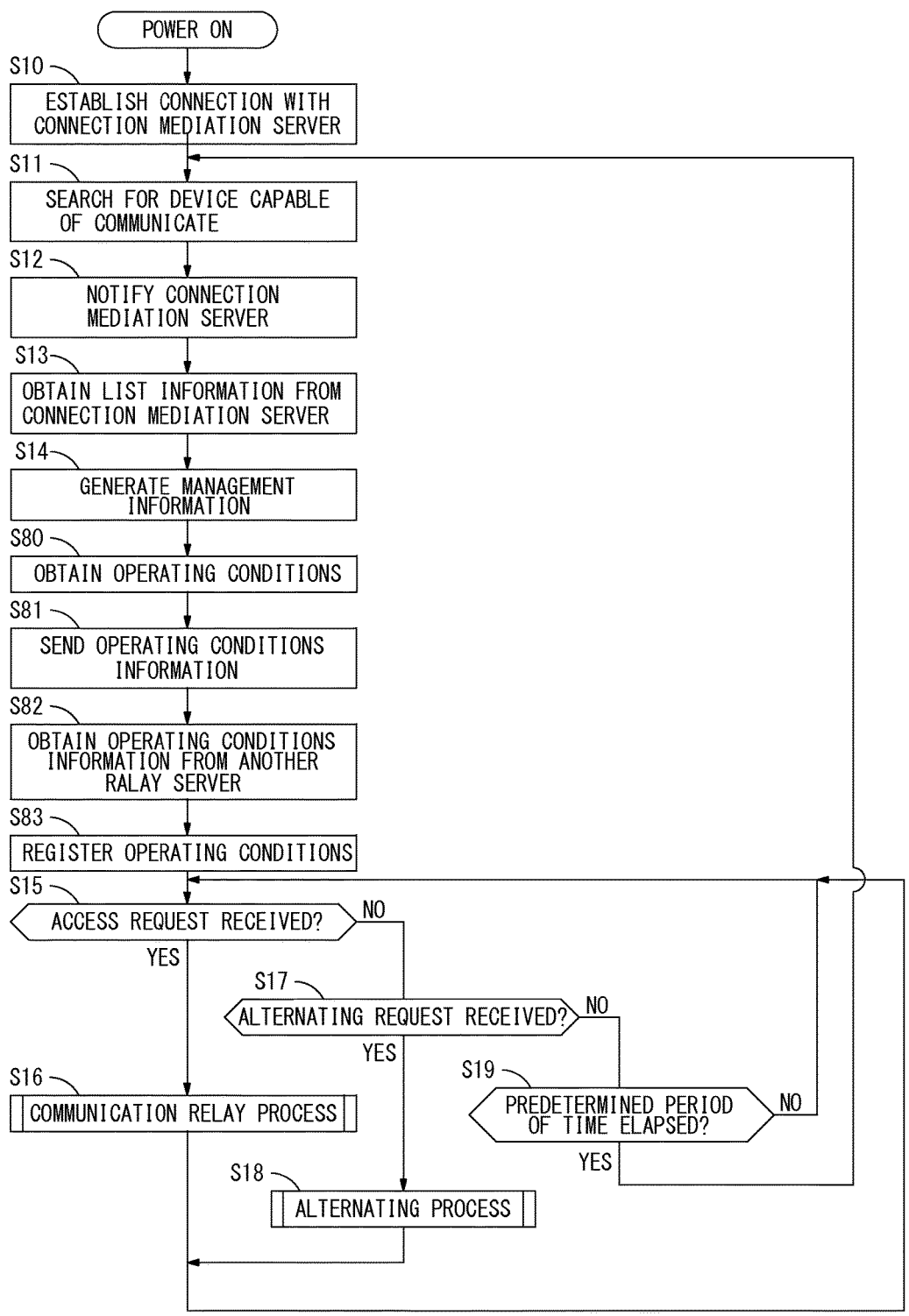
FIG. 16 is a flow diagram explaining an exemplary sequential procedure of the process performed on the relay server of the third preferred embodiment.
Figure 17:
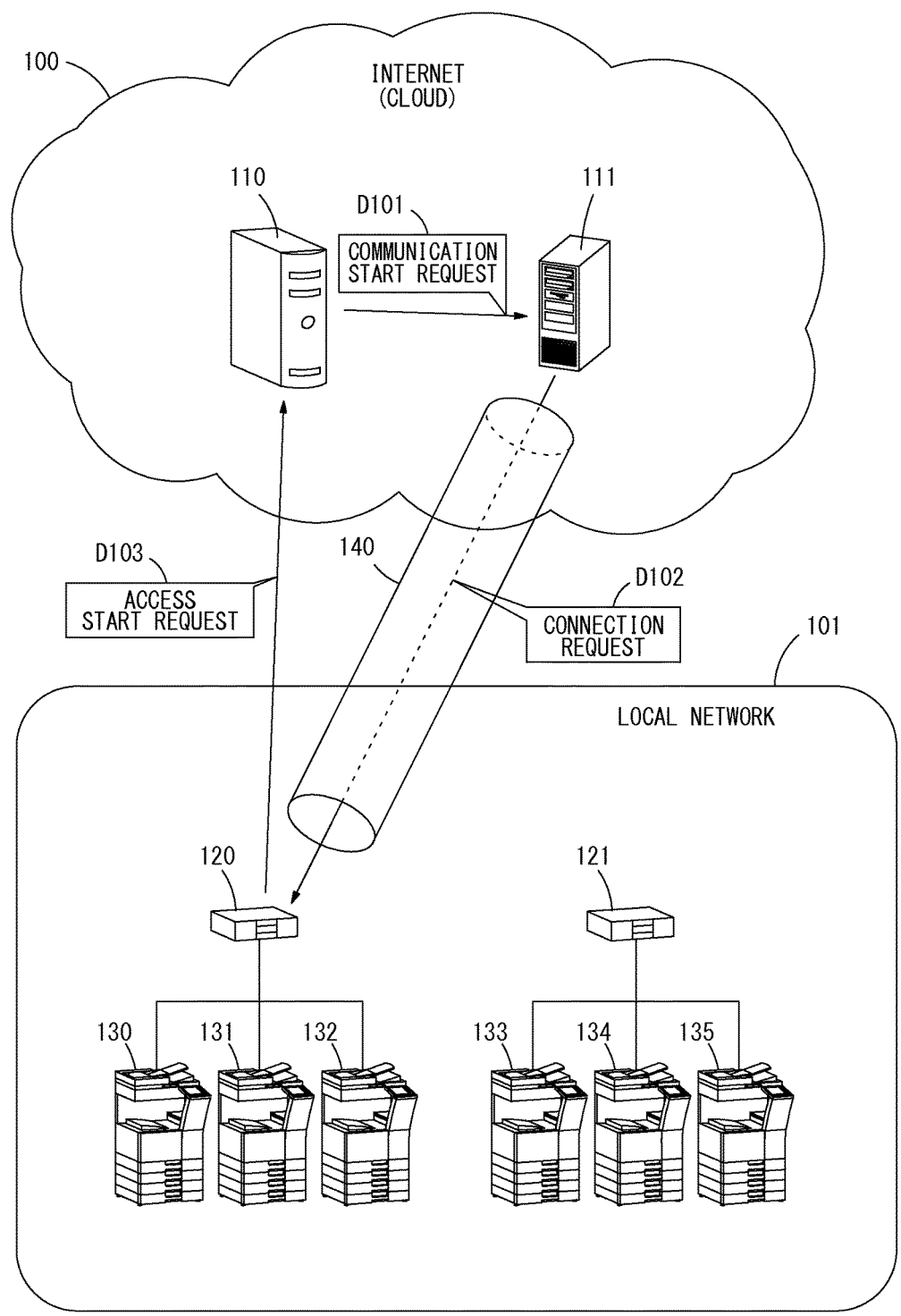
FIG. 17 shows an exemplary configuration of a conventional image forming system.

FIG. 16 is a flow diagram explaining an exemplary sequential procedure performed by each relay server 8a, 8b and 8c of the third preferred embodiment. The exemplary sequential procedure shown in FIG. 16 has process in steps S80 to S83 between the steps S14 and S15, which is different from the exemplary sequential procedure of FIG. 7. To be more specific, after searching for the image forming device with which it is allowed to establish communication and establishing the communication with the connection mediation server 6 at a regular basis, each relay server 8a, 8b and 8c generates or updates the management information 29 (step S14). In response to generating or updating the management information 29, each relay server 8a, 8b and 8c checks the operating conditions of its device, then obtains the operating conditions information D3 (step S80). Each relay server 8a, 8b and 8c sends the operating conditions information D3 of the respective devices to the other relay servers over the local network 3 (step S81). In response to sending the operating conditions information D3 of the respective devices to the other relay servers 8b and 8c, each relay server 8a, 8b and 8c obtains the operating conditions information D4 and D5 from the other relay servers 8b and 8c (step S82), then registers with the management information 29 (step S83).

After receiving the access request from the connection mediation server 6, each relay server 8a, 8b and 8c performs the communication relay process (step S16). The detail of the communication relay process is the same as the one explained in the second preferred embodiment with the flow diagram of FIG. 14. To be more specific, more than one relay server may be selected as the alternative device. In this case, the relay server 8a, 8b or 8c prioritizes the other relay servers to which the alternating request is sent based on the operating conditions of the other relay servers registered in advance with the management information 29. The relay server 8a, 8b or 8c sends the alternating request to the relay server which has high-priority first. In sending the alternating request to the more than one relay server selected as the alternative device one after the other, another relay server which is capable of alternating the relay process of the communication with the application server 5 may be found promptly, resulting in improvement in process efficiency.

Especially in the third preferred embodiment, as described above, each relay server 8a, 8b and 8c does not require communication with the connection mediation server 6 over the internet 2 for obtaining the operating conditions information of the other relay servers. As a result, the operating conditions information of the other relay servers may be obtained efficiently.

As described above, each relay server 8a, 8b and 8c exchanges each other the operating conditions information D3, D4 and D5 before receiving the access request from the connection mediation server 6. However, each relay server 8a, 8b and 8c is not necessarily exchange the information before receiving the access request. It is assumed, for example, the relay server 8a may be busy when receiving the access request from the connection mediation server 6. In this case, the relay server 8a may obtain the operating conditions information D4 and D5 from the respective other relay servers 8b and 8c and determine one of the relay servers to which the alternating request is sent. As described above, the relay server 8a is allowed to obtain the real-time operating conditions information D4 and D5 relating to the respective other relay servers 8b and 8c. Thus, this increases a probability of acceptance of the alternating request sent at first. Another relay server which is capable of alternating the relay server is allowed to be found promptly. In also this case, no communication over the internet 2 is required for obtaining the operating conditions information. The relay server 8a, therefore, is allowed to obtain the real-time operating conditions information of the respective other relay servers 8b and 8c promptly. When more than one relay server is selected as the alternative device by the alternative device selecting part 27, the relay process handing over part 28 of the respective relay servers 8a, 8b and 8c may determine in real-time the alternative device which is not busy from among the more than one relay server, and send the alternating request to the alternative device which is not busy first.

Everything other than the above-described points are the same as what explained in the first and the second preferred embodiments.

Modifications

While the preferred embodiments of the present invention have been described above, the present invention is not limited to the preferred embodiments. Various modifications may be applied to the present invention.

According to the above-described preferred embodiments, more than one image forming device is allocated in advance to the respective relay servers 8a, 8b and 8c to manage. The number of the image forming devices allocated to the relay server is within a predetermined maximum number. The number of the image forming devices allocated to the relay server, however, is not necessarily more than one. Each relay server 8a, 8b and 8c may manage only one image forming device. The relay servers 8a, 8b and 8c of the above-described preferred embodiments are installed as separate devices from the image forming devices 7a to 7i on the local network 3. However, any of the image forming devices may include the functions of the relay servers 8a, 8b and 8c as described above, for example. In this case, the function of each relay server 8a, 8b and 8c may be included in different image forming device of the multiple image forming devices 7a to 7i. In such a case, the function of each relay server 8a, 8b and 8c may be included in each of the multiple image forming devices 7a to 7i.

For sending the alternating request to another relay server selected as the alternative device in the above-described second and third preferred embodiments, the relay server sends the alternating request to another relay server which is not busy first. For prioritizing, the relay server is not necessarily only to determine whether or not another relay server is busy but also to determine if another relay server is online or offline. It is assumed, for example, the connection mediation server 6 does not receive the notice from each relay server 8a, 8b and 8c registered with the list information 17 at a regular basis. In this case, the connection mediation server 6 checks whether or not the continuous connection with the relay server is established. If the continuous connection is established, the connection mediation server 6 determines the relay server is online, then additionally registers that the relay server is online with the list information 17. If the continuous connection with the relay server from which the periodical notice is not received is terminated, the connection mediation server 6 determines the relay server is offline, then additionally registers that the relay server is offline with the list information 17. In obtaining whole or a part of the list information 17 from the connection mediation server 6, each relay server 8a, 8b and 8c obtains information showing that another relay server is either online or offline, and registers the obtained information with the management information 29. When each relay server 8a, 8b and 8c selects more than one relay server as the alternative device, it may give the lower priority to the offline relay server of the more than one relay server than the relay server which is busy. As a result, the relay server which is capable of alternating the relay process may be found more efficiently.

For sending the alternating request to another relay server selected as the alternative device in the above-described second and third preferred embodiments, the relay server determine priorities depending on if the relay server is busy. The priorities are not necessarily determined depending on if the relay server is busy. In order to determine priorities, the detailed operation conditions information including the value of CPU utilization or memory utilization on another relay server may be obtained and the relay server having a low load of the more than one relay server selected as the alternative device may be given the high priority.

According to the preferred embodiments as described above, the image forming device 7a performs the print job based on the data received form the application server 5. The job performed on the image forming device 7a is not always the print job.

What is claimed is:

1. An image forming system, comprises:
an application server installed on an internet;
multiple image forming devices installed on a local network connected to said internet via a firewall;
multiple relay servers, installed on said local network, relaying communication between at least one of said multiple image forming devices and said application server; and
a connection mediation server, installed on said internet, sending an access request to one of said multiple relay servers, and connecting said one relay server to said application server, wherein
said connection mediation server includes a hardware processor configured to:
    communicate with said multiple relay servers at any time;
    identify a relay server which relays the communication between an identified one of said multiple image forming devices and said application server from among said multiple relay servers in response to the connection mediation server receiving a communication start request from said application server to start the communication with said identified one of said multiple image forming devices;
    send the access request to said identified relay server, the identified relay server being configured to send the access request to the application server in response to receiving the access request from the connection mediation server; and establish the communication between said identified image forming device and said application server in response to the relay server sending the access request to the application server, and said relay server includes a hardware processor configured to:

determine, based on operating conditions of the relay server, whether the relay server is busy when receiving the access request from said connection mediation server, by the relay server determining whether any value of (i) hardware processing utilization of the relay server, (ii) memory utilization of the relay server, or (iii) number of communications of the relay server, exceeds a predetermined reference value;

select another relay server which is allowed, in lieu of the relay server itself, to establish communication between the application server and said identified image forming device from among said multiple relay servers when it is determined, based on the operating conditions of the relay server, that the relay server is busy; and send an alternating request to said another relay server when said another relay server is selected, and cause said another relay server to perform a process of relaying the communication between said identified image forming device and said application server.

2. The image forming system according to claim 1, wherein the hardware processor of said connection mediation server is further configured to:

manage device information of said identified image forming device with which said respective relay servers are allowed to establish communication, the hardware processor of said relay server is further configured to:

obtain said device information from said connection mediation server and generate management information relating to said another relay server, thereby holding said generated management information, and select said another relay server based on said management information generated in advance.

3. The image forming system according to claim 2, wherein the hardware processor of said relay server is further configured to search for an image forming device with which the relay server is allowed to establish communication on said local network and notify said connection mediation server of the search result, and obtain said device information from said connection mediation server at the time of notice.

4. The image forming system according to claim 2, wherein the hardware processor of said relay server is configured to send said alternating request to said another relay server which is not busy of said more than one relay server first when said more than one relay server is selected as said another relay server.

5. The image forming system according to claim 2, wherein the hardware processor of said relay server is further configured to:

notify said connection mediation server of the operating conditions of the relay server at a regular basis, and obtain information relating to the operating conditions of the other relay servers from said connection mediation server at the time of notice, thereby registering the obtained information with said management information, and send said alternating request to said another relay server which is not busy first based on the information relating to the operating conditions of said another relay server registered with said management information when said more than one relay server is selected as said another relay server.

6. The image forming system according to claim 2, wherein the hardware processor of said relay server is further configured to:

notify said another relay server of the operating conditions of the relay server at a regular basis, and obtain the information relating to the operating conditions from said another relay server at the time of notice, thereby registering the obtained information with said management information, and send said alternating request to said another relay server which is not busy first based on the information relating to the operating conditions of said another relay server registered with said management information when said more than one relay server is selected as said another relay server.

7. The image forming system according to claim 1, wherein said relay server is configured in said identified image forming device.

8. The image forming system according to claim 1, wherein said connection mediation server receives said communication start request from said application server.

9. The image forming system according to claim 1, wherein each of said relay server and said another relay server is established in one of said multiple image forming devices.

10. The image forming system according to claim 9, wherein the hardware processor of said connection mediation server is further configured to manage in advance said multiple relay servers.

11. The image forming system according to claim 9, wherein the hardware processor of said relay server is further configured to manage in advance said another relay server.

12. A relay server installed on a local network connected to an internet via a firewall, said relay server comprising a hardware processor configured to:

access a connection mediation server on said internet, said relay server being configured to communicate with the connection mediation server at any time, the connection mediation server sending an access request to the relay server in response to the connection mediation server receiving a communication start request from an application server;

connect the application server on said internet in response to the relay server receiving the access request from said connection mediation server, said relay server relaying communication between an identified image forming device on said local network and said application server in response to the relay server receiving the access request from the connection mediation server;

determine, based on operating conditions of the relay server, whether the relay server is busy when receiving the access request from said connection mediation server, by the relay server determining whether any value of (i) hardware processing utilization of the relay server, (ii) memory utilization of the relay server, or (iii) number of communications of the relay server, exceeds a predetermined reference value;

select another relay server which is allowed, in lieu of the relay server itself, to establish communication between the application server and said identified image forming device as an alternative device when it is determined, based on the operating conditions of the relay server, that the relay server is busy; and send an alternating request to said another relay server when said another relay server is selected, and cause said another relay server to perform a process of relaying the communication between said identified image forming device and said application server.

13. The relay server according to claim 12, wherein
said connection mediation server manages device information of said identified image forming device with which the respective relay servers are allowed to establish communication, the hardware processor is further configured to:
obtain said device information from said connection mediation server and generate management information relating to said another relay server, thereby holding said generated management information, and select said another relay server based on said management information generated in advance.

14. The relay server according to claim 13, wherein
the hardware processor is configured to search for said identified image forming device with which the relay server is allowed to establish communication on said local network and notify said connection mediation server of the search result, and obtain said device information from said connection mediation server at the time of notice.

15. The relay server according to claim 13, wherein
the hardware processor is configured to send said request to said another relay server which is not busy of more than one said relay server first when said more than one relay server is selected as said another relay server.

16. The relay server according to claim 13, wherein
the hardware processor is further configured to:
notify said connection mediation server of the operating conditions of the relay server at a regular basis, and obtain information relating to the operating conditions of the other relay servers from said connection mediation server at the time of notice, thereby registering the obtained information with said management information, and send said alternating request to said another relay server which is not busy first based on the information relating to the operating conditions of said another relay server registered with said management information when said more than one relay server is selected as said another relay server.

17. The relay server according to claim 13, wherein
the hardware processor is configured to:
notify said another relay server of the operating conditions of the relay server at a regular basis, and obtain the information relating to the operating conditions from said another relay server at the time of notice, thereby registering the obtained information with said management information, and send said alternating request to said another relay server which is not busy first based on the information relating to the operating conditions of said another relay server registered with said management information when said more than one relay server is selected as said another relay server.

18. The relay server according to claim 12, wherein the hardware processor is further configured to:
perform a process of relaying the communication between said identified image forming device and said application server when it is determined, based on the operating conditions of the relay server, that the relay server is not busy at the receipt of the access request from said connection mediation server, and perform an alternating process of relaying the communication between said identified image forming device designated with said alternating request and said application server when said alternating request is received from said another relay server.

19. The relay server according to claim 18, wherein
said alternating process is not performed if it is determined, based on the operating conditions of the relay server, that the relay server is busy at the receipt of said alternating request.

20. The relay server according to claim 12, wherein
said relay server is configured in said identified image forming device.

21. The relay server according to claim 20, wherein
said another relay server is established in another image forming device.

22. The relay server according to claim 21, wherein the hardware processor is further is further configured to:
manage in advance said another relay server.

23. A connection mediation server established on an internet causing a relay server according to claim 21 to connect to an application server established on said internet, and the hardware processor is configured to:
identify said relay server which relays communication between one of multiple image forming devices and said application server from among multiple said relay servers in response to receiving a communication start request designating said one of multiple image forming devices; and send an access request to said identified relay server, and establish the communication between said one of multiple image forming devices and said application server.

24. A connection mediation server established on an internet causing a relay server according to claim 21 to connect to an application server established on said internet, and the hardware processor is configured to:
manage in advance multiple said relay servers.

25. A communication controlling method performed on a connection mediation server established on an internet to cause a relay server according to claim 21 to connect to an application server established on said internet, comprising the steps of:
identifying said relay server which relays communication between one of multiple image forming devices and said application server from among multiple said relay servers in response to receiving a communication start request designating said one of multiple image forming devices; and sending an access request to said identified relay server, and establishing the communication between said one of multiple image forming devices and said application server.

26. A communication controlling method performed on a connection mediation server established on an internet to cause a relay server according to claim 21 to connect to an application server established on said internet, comprising the step of:

managing in advance multiple said relay servers.

27. A non-transitory computer readable recording medium on which a program is recorded, said program executable on a connection mediation server established on an internet and causes a relay server according to claim 21 to connect to an application server established on said internet, said program causing said connection mediation server to execute the steps of:

identifying said relay server which relays communication between one of multiple image forming devices and said application server from among multiple said relay servers in response to receiving a communication start request designating said one of multiple image forming devices; and sending an access request to said identified relay server, and establishing the communication between said one of multiple image forming devices and said application server.

28. A non-transitory computer readable recording medium on which a program is recorded, said program executable on a connection mediation server established on an internet and causes a relay server according to claim 21 to connect to an application server established on said internet, said program causing said connection mediation server to execute the step of:

managing in advance multiple said relay servers.

29. A communication controlling method performed on a relay server installed on a local network connected to an internet via a firewall, comprising the steps of:

(a) connecting to a connection mediation server installed on said internet, said relay server being configured to communicate with the connection mediation server at any time, the connection mediation server sending an access request to the relay server in response to the connection mediation server receiving a communication start request from an application server; and (b) connecting to the application server installed on said internet in response to the relay server receiving the access request from said connection mediation server, and relaying a communication between an identified image forming device installed on said local network and said application server in response to the relay server receiving the access request from the connection mediation server, wherein said step (b) further comprises the steps of:

(b-1) determining whether or not operating conditions of the relay server, whether the relay server is busy when receiving the access request from said connection mediation server, by the relay server determining whether any value of (i) hardware processing utilization of the relay server, (ii) memory utilization of the relay server, or (iii) number of communications of the relay server, exceeds a predetermined reference value;

(b-2) selecting another relay server which is allowed, in lieu of the relay server itself, to establish communication between the application server and said identified image forming device when it is determined, based on the operating conditions of the relay server, that the relay server is busy; and (b-3) sending an alternating request to said another relay server, and causing said another relay server to perform a process of relaying the communication between said identified image forming device and said application server when said another relay server is selected.

30. The communication controlling method according to claim 29, wherein said relay server is established in said identified image forming device, and said another relay server is established in another image forming device.

31. The communication controlling method according to claim 30, further comprising the step of:

(c) managing in advance said another relay server.

32. A non-transitory computer readable recording medium on which a program is recorded, said program executable on a relay server installed on a local network connected to an internet via a firewall, said program executed on said relay server to function as a system comprising a hardware processor configured to:

connect to a connection mediation server installed on said internet, said relay server being configured to communicate with the connection mediation server at any time, the connection mediation server sending an access request to the relay server in response to the connection mediation server receiving a communication start request from an application server;

connecting to the application server on said internet in response to the relay server receiving the access request from said connection mediation server, said relay server relaying a communication between an identified image forming device installed on said local network and said application server in response to the relay server receiving the access request from the connection mediation server:

determine whether or not operating conditions of the relay server, whether the relay server is busy when receiving the access request from said connection mediation server, by the relay server determining whether any value of (i) hardware processing utilization of the relay server, (ii) memory utilization of the relay server, or (iii) number of communications of the relay server, exceeds a predetermined reference value;

select another relay server which is allowed, in lieu of the relay server itself, to establish communication between the application server and said identified image forming device when it is determined, based on the operating conditions of the relay server, that the relay server is busy; and send an alternating request to said another relay server when said another relay server is selected and causing said another relay server to perform a process of relaying the communication between said identified image forming device and said application server.

33. The non-transitory computer readable recording medium according to claim 32, wherein said relay server is established in said identified image forming device, and said another relay server is established in another image forming device.

34. The non-transitory computer readable recording medium according to claim 33, said program executed on said relay server to function as the system and the hardware processor further configured to manage in advance said another relay server.

* * * * *